United States Patent
Tsuchiya et al.

(10) Patent No.: US 7,051,173 B2
(45) Date of Patent: May 23, 2006

(54) BACKUP SYSTEM AND METHOD THEREOF IN DISK SHARED FILE SYSTEM

(75) Inventors: Yoshihiro Tsuchiya, Kawasaki (JP); Yoshitake Shinkai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 586 days.

(21) Appl. No.: 09/752,467

(22) Filed: Jan. 3, 2001

(65) Prior Publication Data

US 2001/0013102 A1 Aug. 9, 2001

(30) Foreign Application Priority Data

Feb. 4, 2000 (JP) ............................ 2000-027132

(51) Int. Cl.
*G06F 12/00* (2006.01)

(52) U.S. Cl. .................. 711/162; 711/161; 711/100; 711/114; 711/147; 711/153; 711/160; 711/165; 714/4; 714/5; 714/78; 714/11; 714/12; 714/15; 714/31; 714/38; 714/39; 714/42; 714/45; 714/13; 707/202; 707/204; 713/178

(58) Field of Classification Search ........ 707/202–204, 707/200; 711/161–162, 114, 100, 106, 147, 711/153, 159–160, 165; 714/4–5, 11–13, 714/43, 15–16, 19–20, 25, 31, 78, 38–39, 714/42, 45; 713/178

See application file for complete search history.

(56) References Cited

U.S. PATENT DOCUMENTS

| | | | | |
|---|---|---|---|---|
| 5,381,539 A | * | 1/1995 | Yanai et al. ................. 711/133 |
| 5,381,545 A | * | 1/1995 | Baker et al. ................... 714/19 |
| 5,440,727 A | * | 8/1995 | Bhide et al. ................. 711/117 |
| 5,455,947 A | * | 10/1995 | Suzuki et al. ................ 707/204 |
| 5,471,631 A | * | 11/1995 | Beardsley et al. .......... 713/502 |
| 5,485,608 A | * | 1/1996 | Lomet et al. ................ 707/202 |
| 5,555,371 A | * | 9/1996 | Duyanovich et al. .......... 714/13 |
| 5,701,437 A | * | 12/1997 | Kinjo et al. ................. 711/162 |
| 5,724,581 A | * | 3/1998 | Kozakura .................... 707/202 |
| 5,737,600 A | * | 4/1998 | Geiner et al. ................ 707/200 |
| 5,764,877 A | * | 6/1998 | Lomet et al. ................... 714/6 |
| 5,828,821 A | * | 10/1998 | Hoshina et al. ............... 714/15 |
| 5,951,695 A | * | 9/1999 | Kolovson ..................... 714/16 |
| 5,996,088 A | * | 11/1999 | Frank et al. .................... 714/6 |
| 6,061,769 A | * | 5/2000 | Kapulka et al. ............. 711/162 |
| 6,065,018 A | * | 5/2000 | Beier et al. ................. 707/202 |
| 6,076,095 A | * | 6/2000 | Clark et al. ................. 707/202 |
| 6,154,847 A | * | 11/2000 | Schofield et al. .............. 714/4 |
| 6,185,663 B1 | * | 2/2001 | Burke ......................... 711/156 |
| 6,226,651 B1 | * | 5/2001 | Masuda et al. ............. 707/202 |

(Continued)

FOREIGN PATENT DOCUMENTS

GB 2290396 A * 12/1995
JP 07244645 A * 9/1995

*Primary Examiner*—B. James Pelkari
*Assistant Examiner*—Zhuo H. Li
(74) *Attorney, Agent, or Firm*—Staas & Halsey LLP

(57) ABSTRACT

At the time of a backup process of the sharing disk in a disk shared file system, the write cache of each computer is reflected on a sharing disk, and data of the sharing disk is copied in a backup medium as a batch. Further, blocks to be backed up are listed to be copied in the backup medium as a batch. Then, the log of each computer is stored in a log medium, and the data at the start point of a backup process is formed using the log.

13 Claims, 41 Drawing Sheets

U.S. PATENT DOCUMENTS 6,338,146 B1 * 1/2002 Johnson et al. ................. 714/4
6,397,351 B1 * 5/2002 Miller et al. ................... 714/13
6,449,734 B1 * 9/2002 Shrivastava et al. .......... 714/15
6,466,950 B1 * 10/2002 Ono ........................... 707/201
6,671,705 B1 * 12/2003 Duprey et al. .............. 707/204
6,721,765 B1 * 4/2004 Ghosh et al. ................ 707/202

* cited by examiner

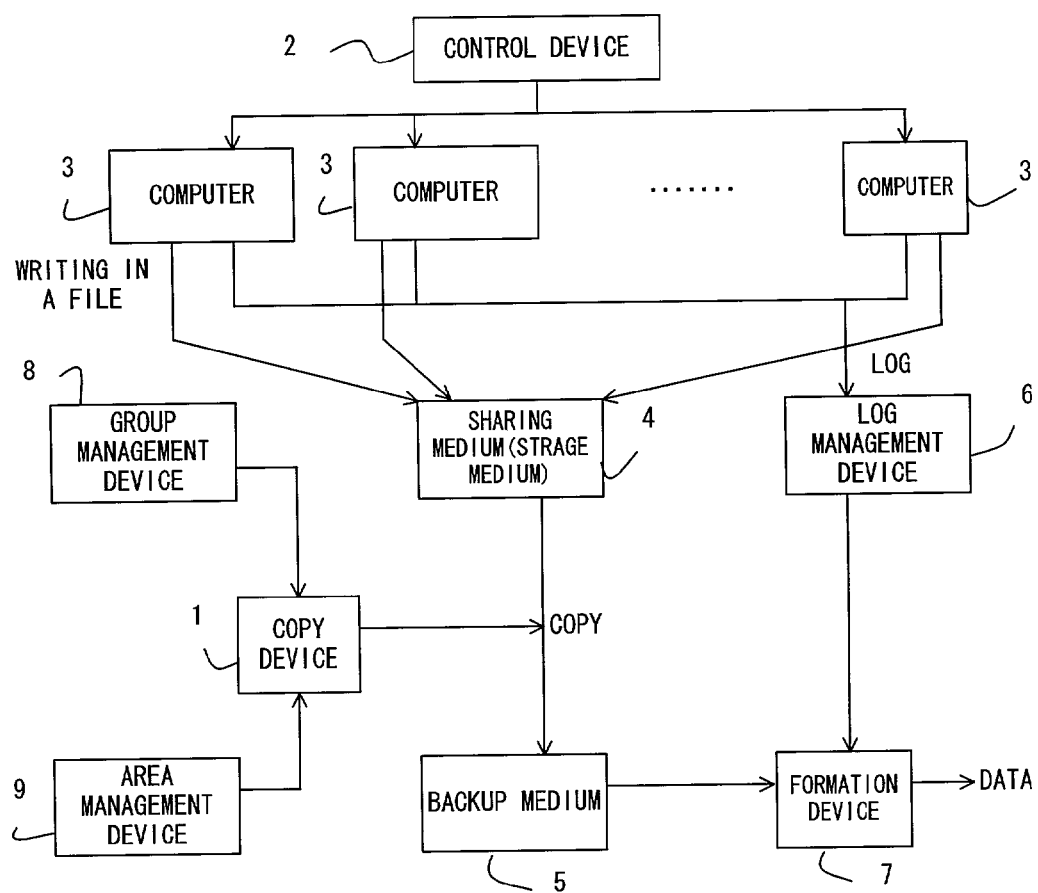
F I G. 1

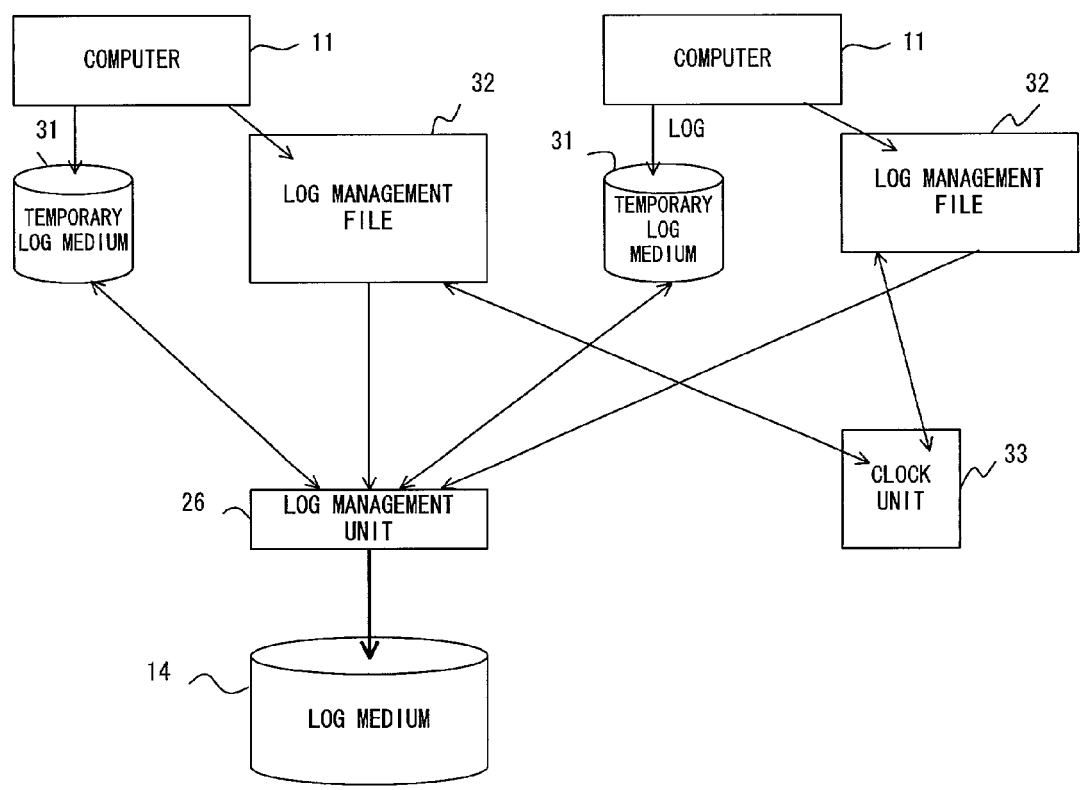
F I G. 4

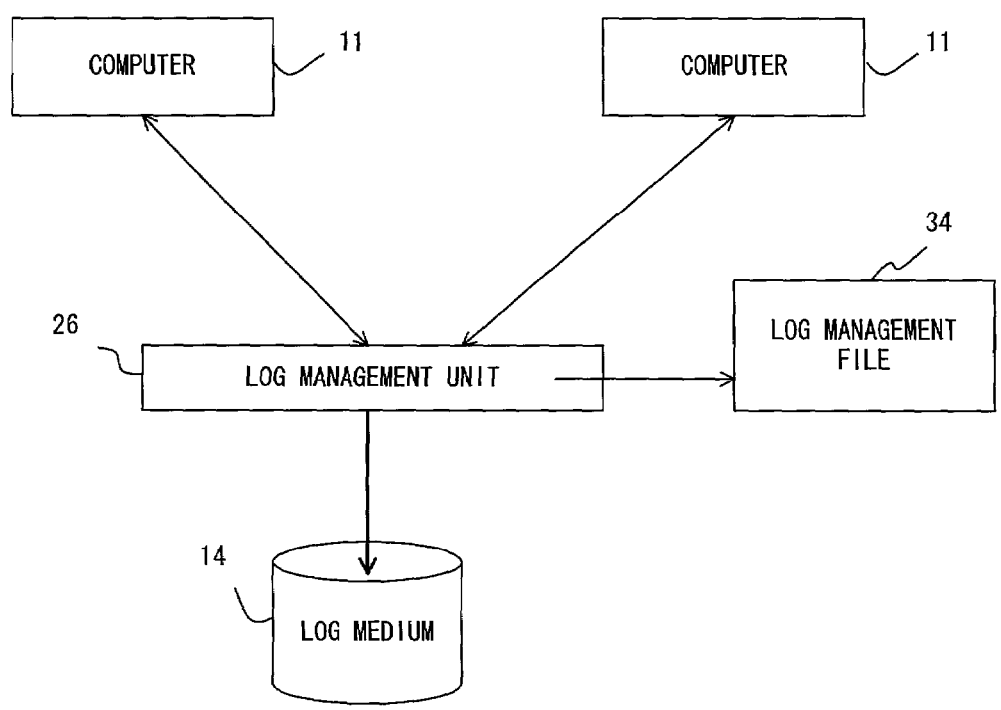
F I G. 6

| DEVICE NAME | ORIGINAL ADDRESS | LENGTH |
|---|---|---|
| α | #a | 2 |
| β | #b | 1 |
| . . . . | . . . . | . . . . |

FIG. 10

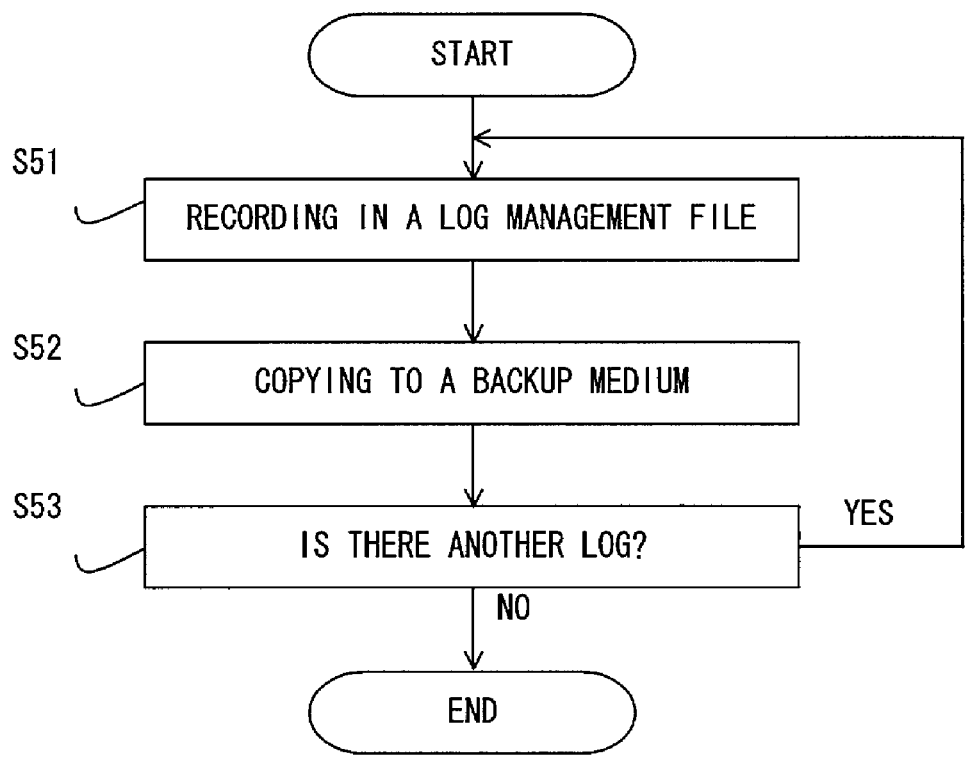
F I G. 1 3

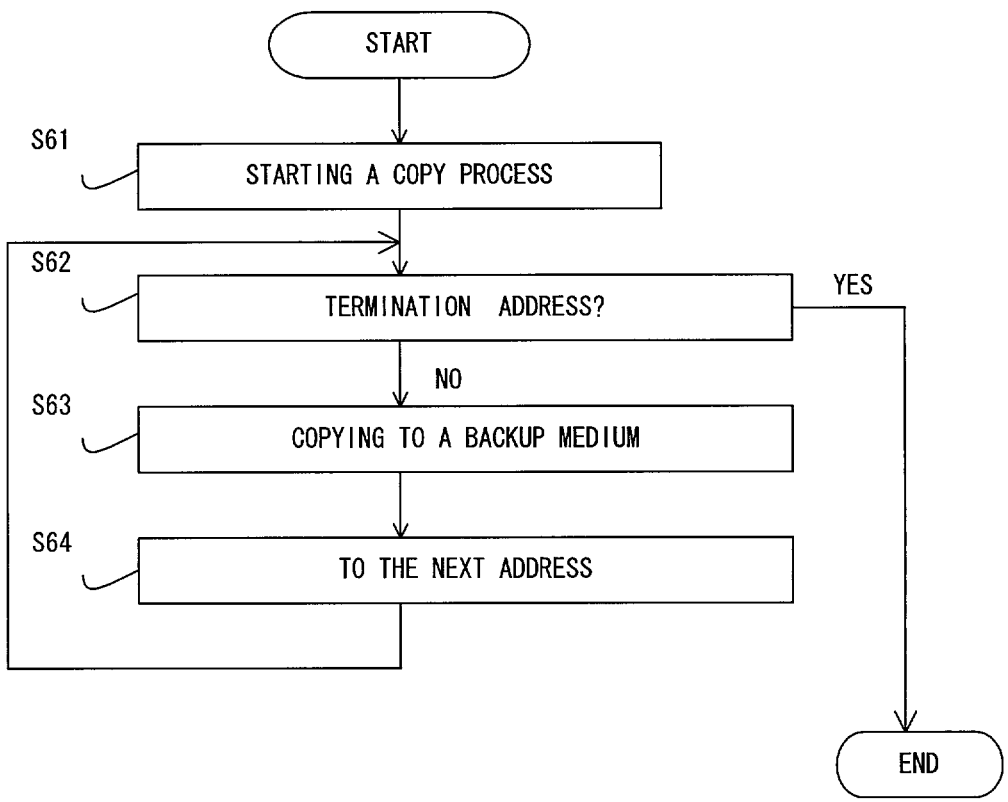
F I G. 1 4

| ORIGINAL ADDRESS | LENGTH | CONTENTS OF LOG |
|---|---|---|
| #a | 1 | XXXX |
| #b | 3 | XXXX |
| . . . . | . . . . | . . . . |

F I G. 1 6

| FLAG | BLOCK NO. |
|---|---|
| ○ | 1 |
| × | 2 |
| ○ | 3 |
| ○ | 4 |
| × | 5 |
| × | 6 |
| ⋮ | ⋮ |

FIG. 18

| BLOCK NO. |
|:---:|
| 2 |
| 5 |
| 6 |
| ⋮ |

FIG. 19 dir_A/*
dir_C/*
X dir_D/file_d

FIG. 22 dir__X/file__a
dir__Y/file__b
dir__Z/ *
X dir__Z/file__c

FIG. 23

```
blockno 1, 2, 3
blockno 8, 9
blockno 123
blockno 12567, 12568
blockno 35670
```

FIG. 24

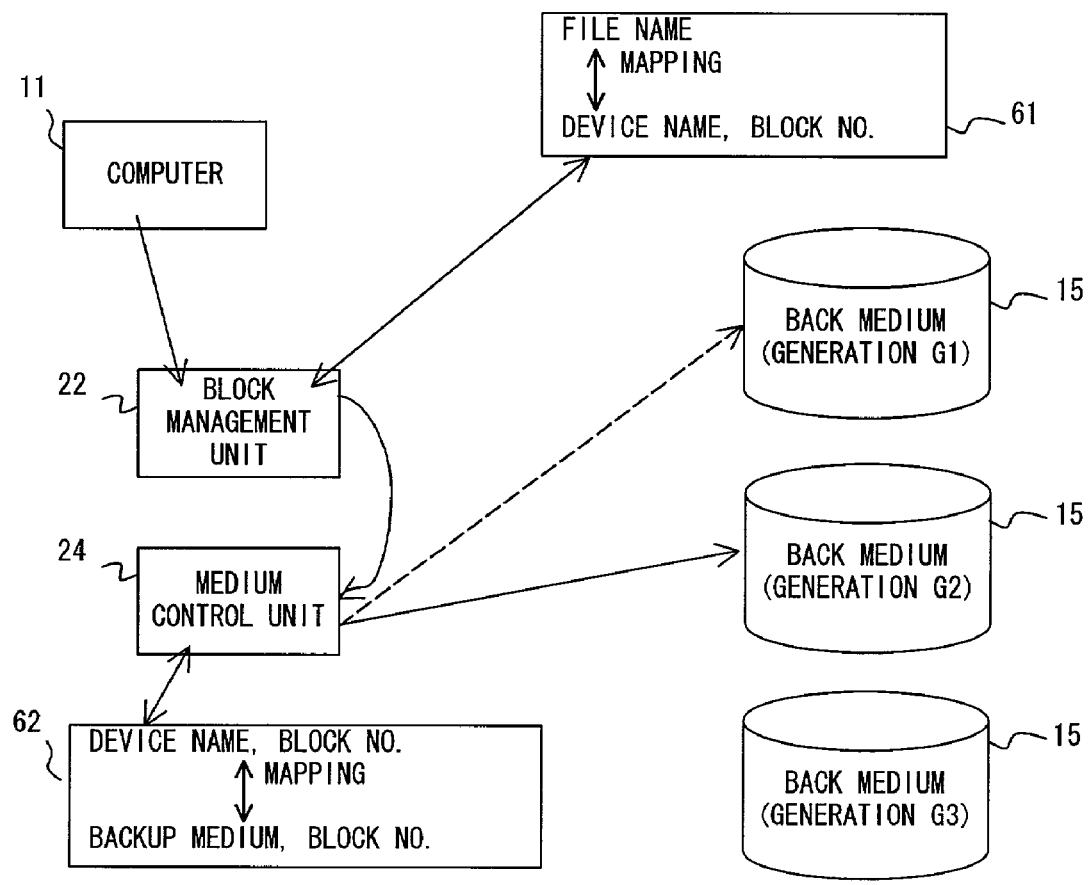
F I G. 3 0

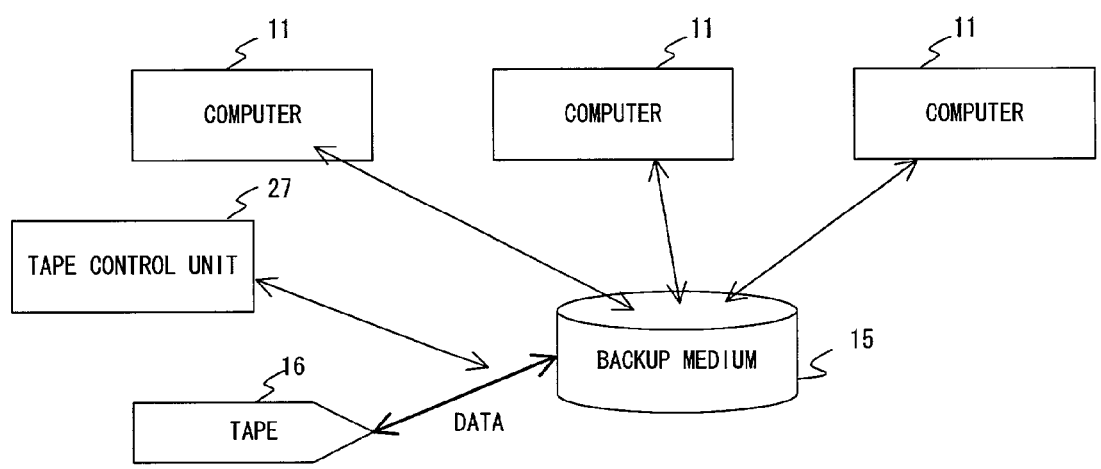
F I G. 3 2

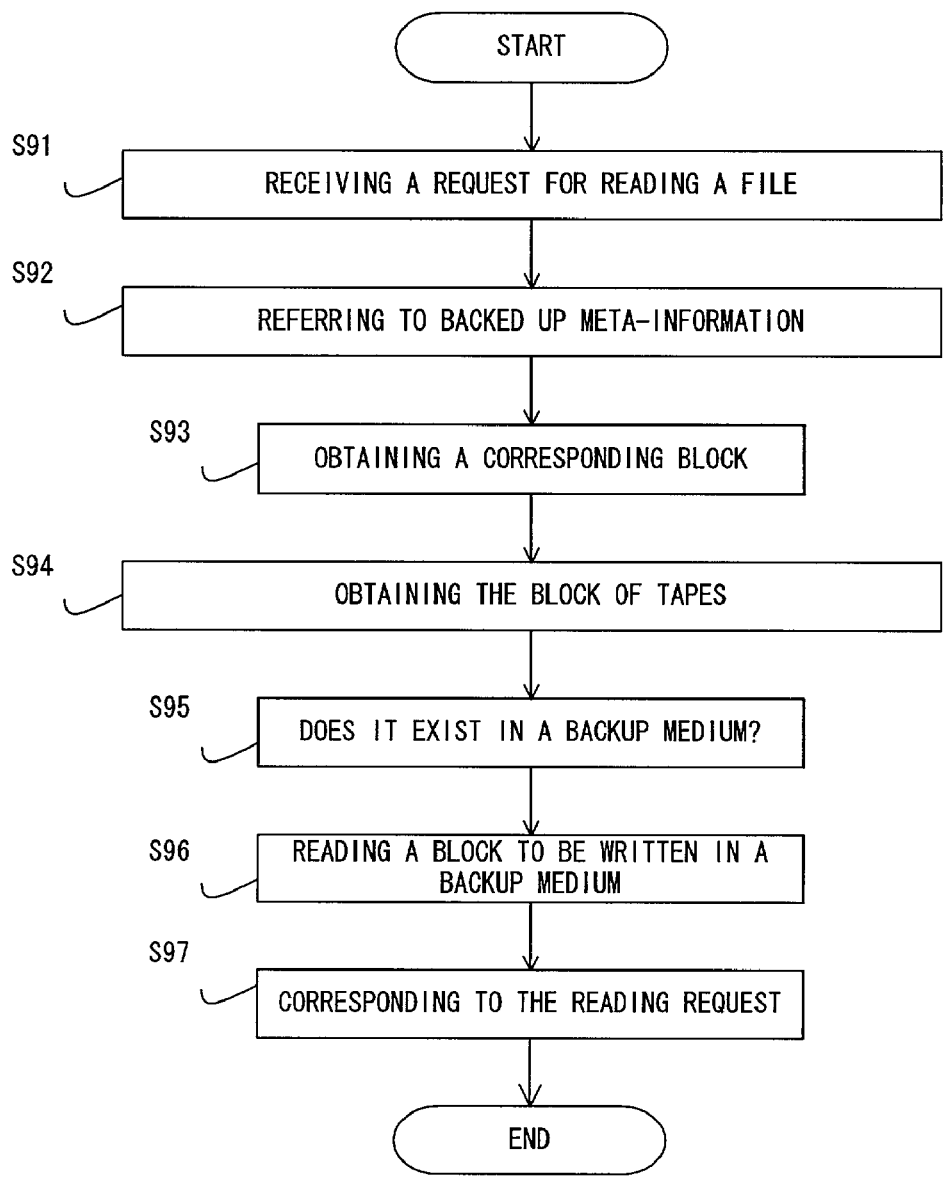
F I G. 3 3

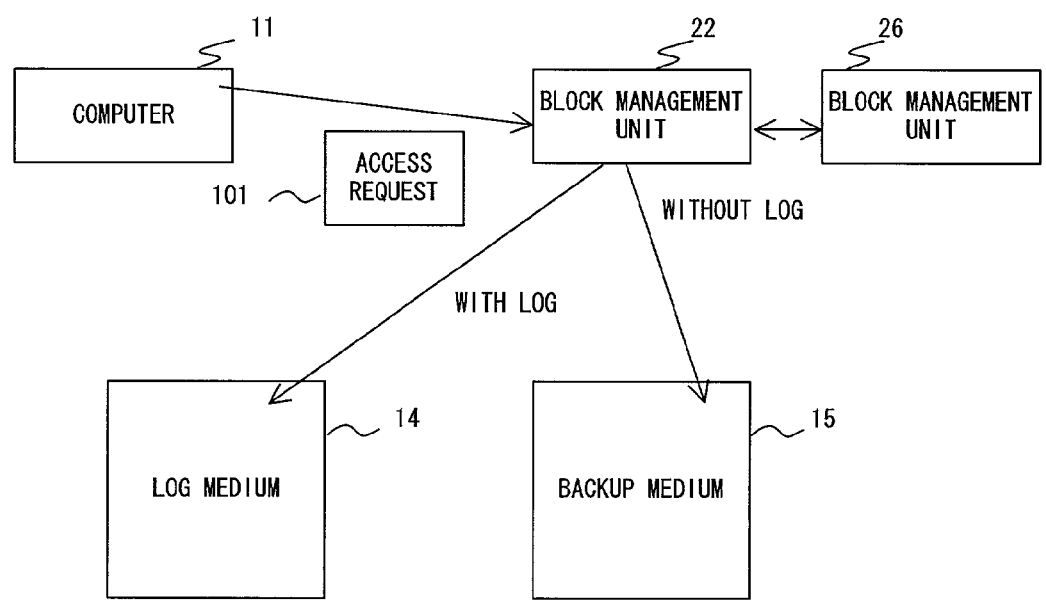
F I G. 3 4

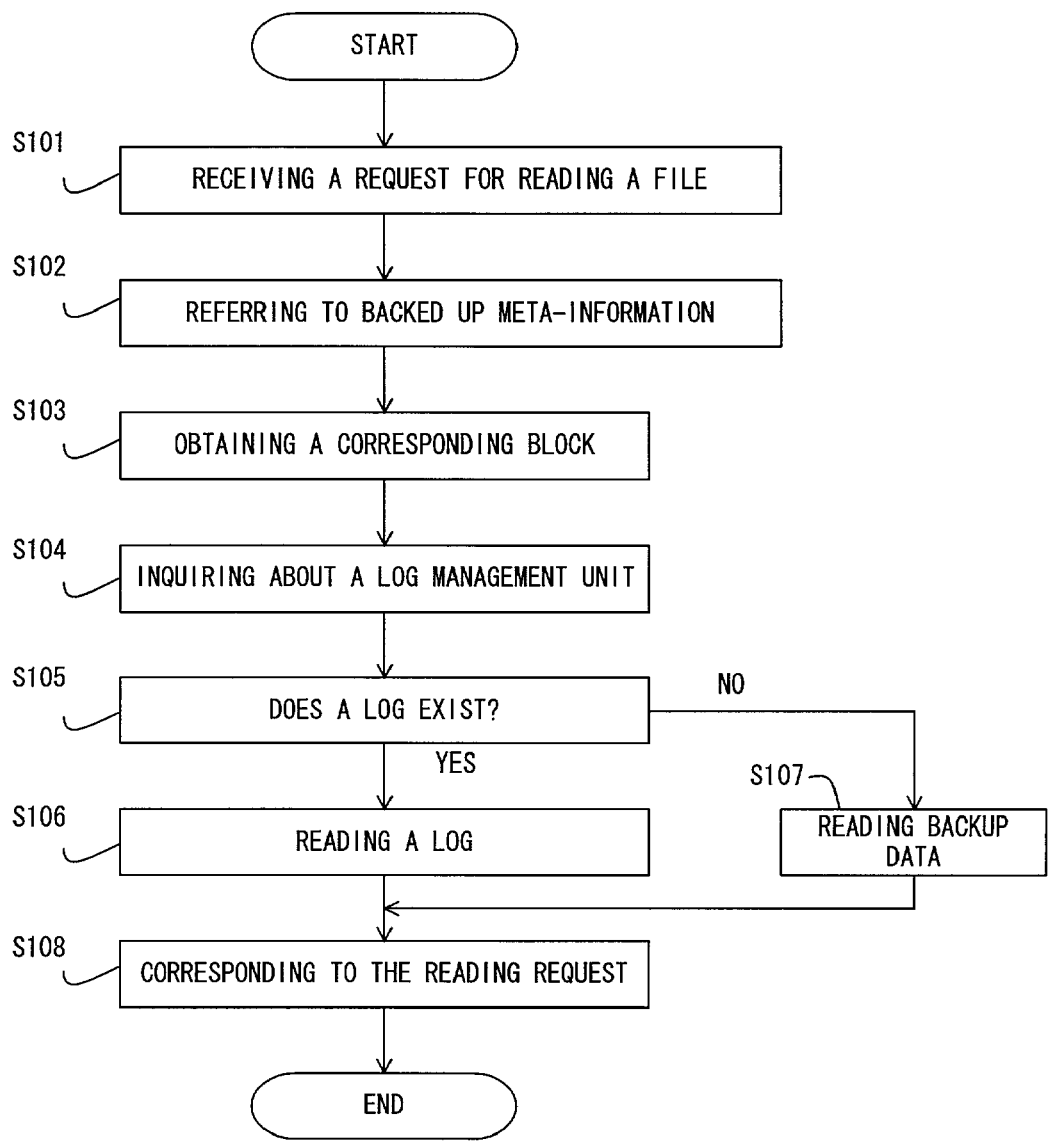
F I G. 35

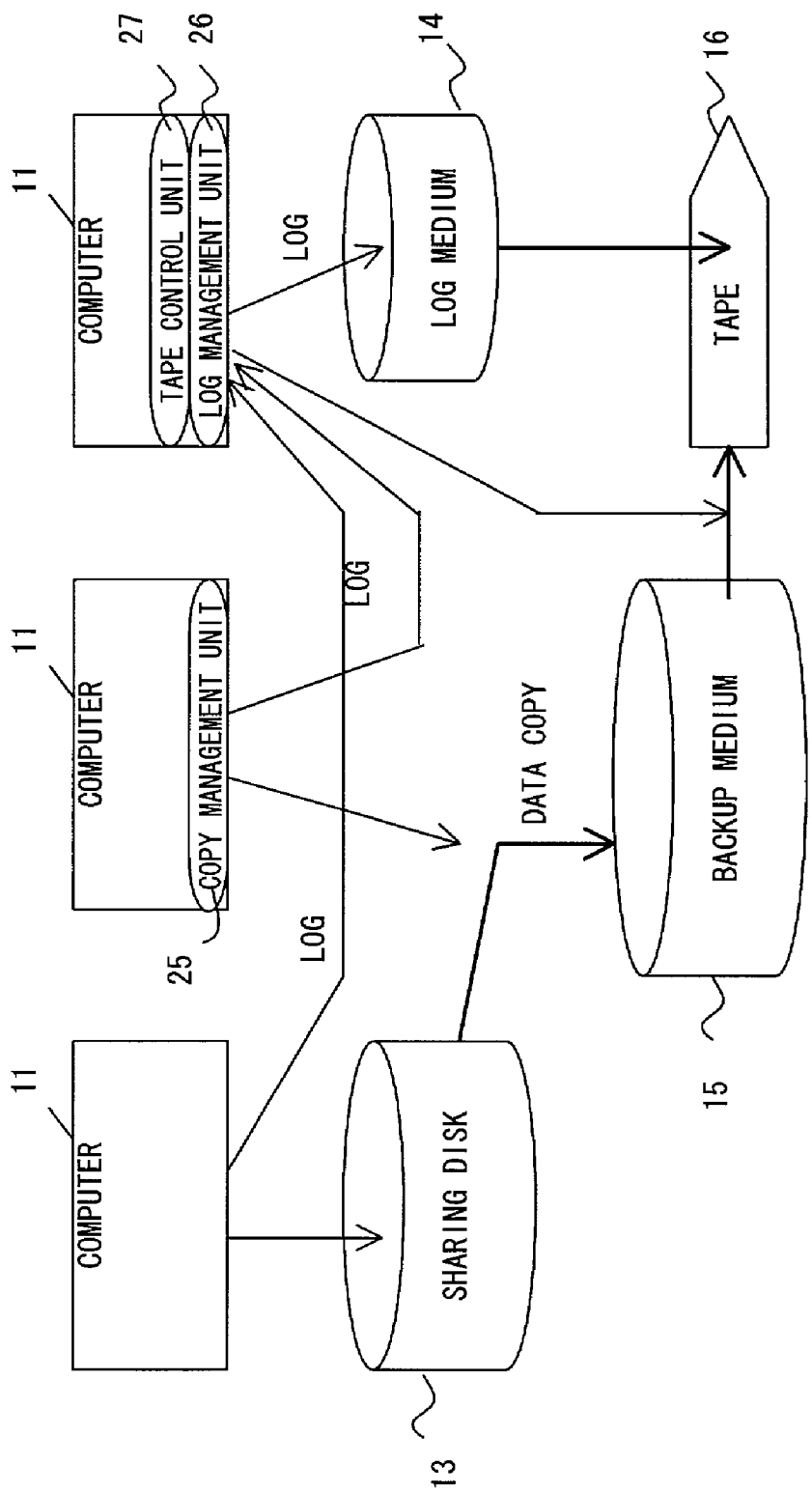
F I G. 36

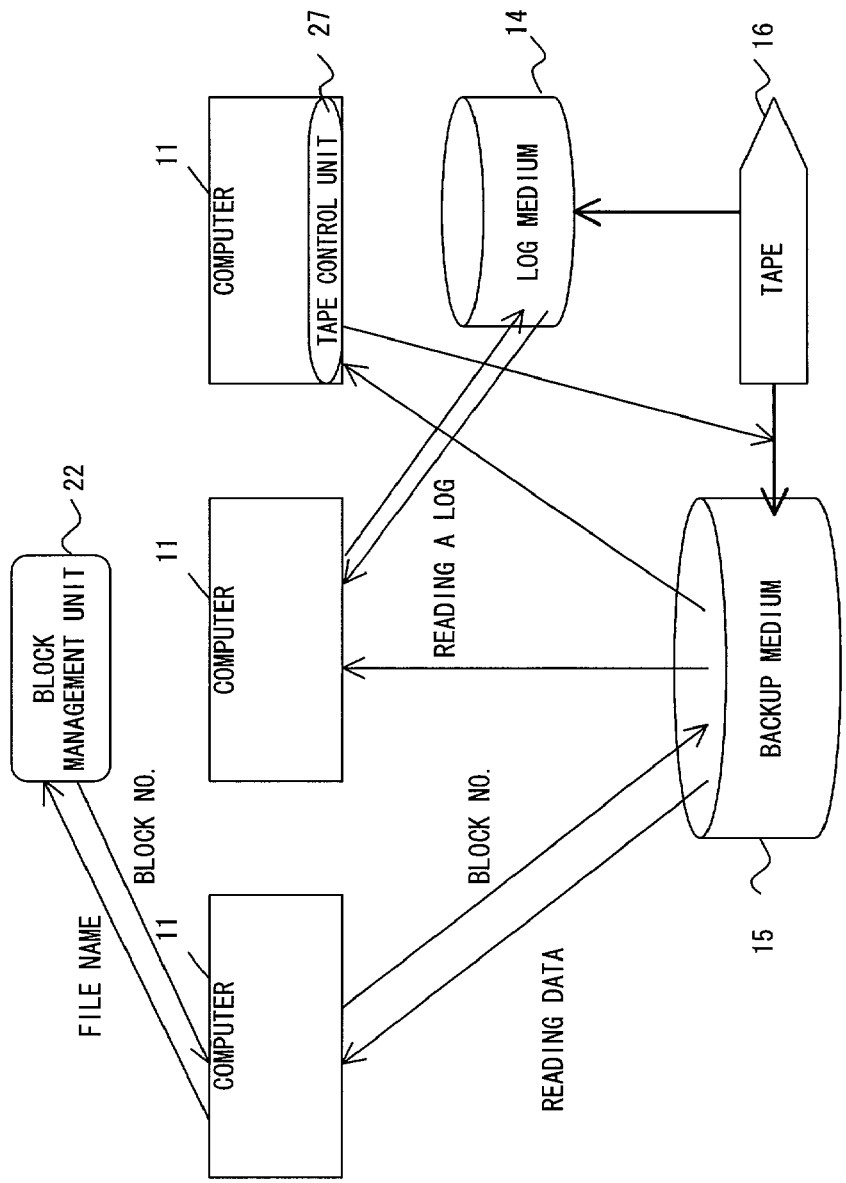
F I G. 37

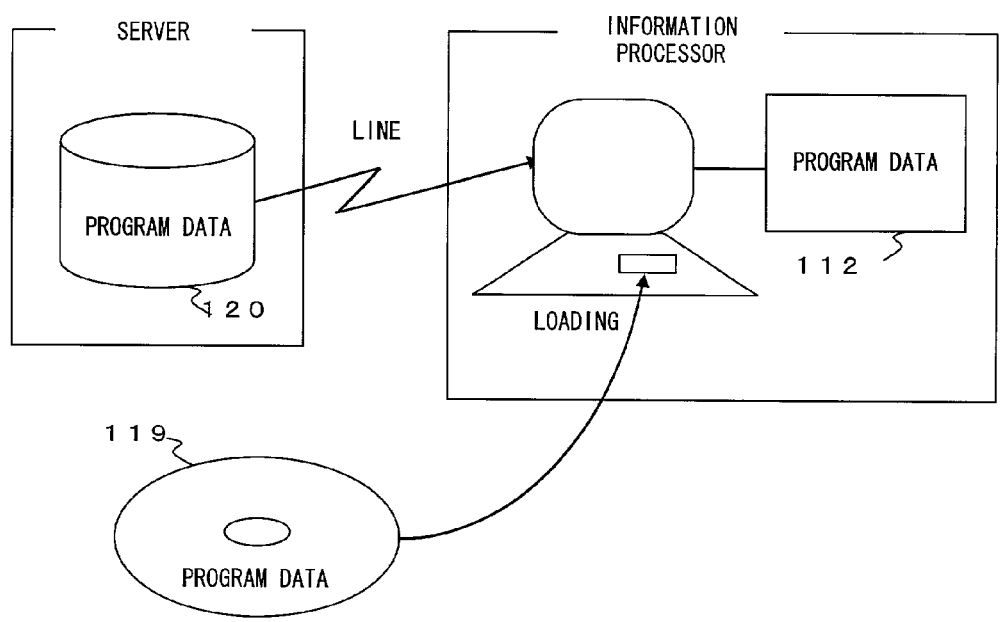
F I G. 4 1

BACKUP SYSTEM AND METHOD THEREOF IN DISK SHARED FILE SYSTEM

BACKGROUND OF THE INVENTION

1. Field of the Invention

The present invention is related to a system and a method thereof for backing up the data stored in a storage medium of the disk, etc. in a calculator (computer) system, and for restoring process the data if necessary.

2. Description of the Related Art

In a conventional computer system, the block information about an address etc. of the block that is being used is checked in the units of files when a file system performs a backup process. The file is read by reading out the data of the corresponding block from a disk, and the thus-read data is copied on a tape. The backup process of files was carried out by repeating the above-mentioned processes for each file.

In this method, however, since the access to a disk almost becomes a random access at the time of backing up many files, the performance of the system deteriorates.

Then, an image backup method for directly copying a plurality of blocks occupied by a file has come to be used, to economize a backup process. In this method, the computer system copies the area of blocks occupied by a file in a disk as a batch, instead of copying files selectively. Therefore, a backup process is carried out by accessing a disk one time, so that the process is economized.

However, there is a problem like the following, in the above-mentioned conventional backup method.

In the conventional image backup method, data can be copied in the units of disks, but data cannot be copied in the units of files or directories. Therefore, there is a problem that not-required data is also copied. Further, in order to restore the backed-up data, all the data should be copied and developed on a disk.

Further, the following problem occurs when a backup process is performed in a cluster system where a plurality of computers perform processes sharing a disk.

The cluster system is equipped with a file system (disk shared file system) for enabling a plurality of computers to access the shared disk simultaneously. Each computer is equipped with an area for caching the write data. Therefore, it is impossible to perform a general image backup method, since the contents of the cached write data (write cache) are not reflected on the copy only by coping the shared disk.

In a conventional computer system, an image backup method is performed during the operation of business (on-line). Therefore, when data is changed, the file system degenerates the original data which has not been changed into a different area, copies the disk, and then writes the degenerated original data over the copied data. In this way, the contents at the start point of the backup process can be determined on the backup data.

In the cluster system, however, changes made by a plurality of computers may occur almost simultaneously to the same file area. Therefore, there is a problem that a method of determining the contents at the time of starting the backup process using the original data cannot be exactly defined.

Thus, in the conventional backup method, a great amount of data in the cluster system cannot be backed-up efficiently. Therefore, an effective backup method in a cluster system has not been developed, nor exists even a method for effectively inspecting the backed-up data.

SUMMARY OF THE INVENTION

The subject of the present invention is to offer a system and method thereof for efficiently backing-up data in a computer system having a disk shared file system.

In the first aspect of the present invention, a backup system is provided with a copy device and control device, and backup a sharing medium shared by a plurality of computers. The copy device copies a plurality of unit areas of the sharing medium in a backup medium as a batch. The control device controls the write data that each computer writes in the sharing medium, and reflects the write data of each computer on the sharing medium at the time of a backup process.

In the second aspect of the present invention, the backup system is provided with a log management device and formation device, and backs up the sharing medium shared by a plurality of computers. When any one of the computers accesses the sharing medium, the log management device controls the original data before an access occurs as a log, and forms an entire log gathering logs of two or more computers. After that, the formation device forms the data at the start point of the backup process using the entire log.

In the third aspect of the present invention, a backup system is provided with a copy device and group management device, and backs up the sharing medium shared by a plurality of computers. The group management device sets a group of the files stored in the sharing medium, and lists the unit areas occupied by the files included in the group. The copy device copies a plurality of the listed unit areas in the backup medium as a batch.

In the fourth aspect of the present invention, a backup system is provided with a copy device and area management device, and backs up a storage medium for storing the file accessed by computers. The area management device judges whether a unit area is being used for each unit area of the storage medium, and lists the being-used unit areas. The copy device copies a plurality of the listed unit areas in the backup medium as a batch.

In the fifth aspect of the present invention, a backup system is provided with a copy device and area management device, and backs up the storage medium for storing the file accessed by computers. The area management device lists the unit areas that have been changed after the previous backup process among the unit areas of the storage medium, as differences. The copy device copies a plurality of the listed unit areas in the backup medium as difference backup data as a batch.

BRIEF DESCRIPTION OF THE DRAWINGS

FIG. 1 is a block diagram showing a backup system of the present invention;

FIG. 4 a diagram showing the first log management;

FIG. 6 is a diagram showing the second log management;

FIG. 10 is a table showing a log management file;

FIG. 13 is a flowchart showing the third log record process;

FIG. 14 is a flow chart showing the second copy process;

FIG. 16 is a table showing the data format of a log medium;

FIG. 18 is a control table of empty areas;

FIG. 19 is a list of used blocks;

FIG. 22 is the first group list;

FIG. 23 is the second group list;

FIG. 24 a group block list;

FIG. 30 is a drawing showing generation management;

FIG. 32 is a drawing showing a backup medium functioning as a buffer;

FIG. 33 is a flowchart showing the second reference process;

FIG. 34 is a diagram showing the reference process of a log;

FIG. 35 is a flowchart showing the third reference process;

FIG. 36 is a drawing showing the first backup process;

FIG. 37 is a drawing showing the first restoring process;

FIG. 41 is a drawing showing a storage medium.

DESCRIPTION OF THE PREFERRED EMBODIMENTS

Figure 2:
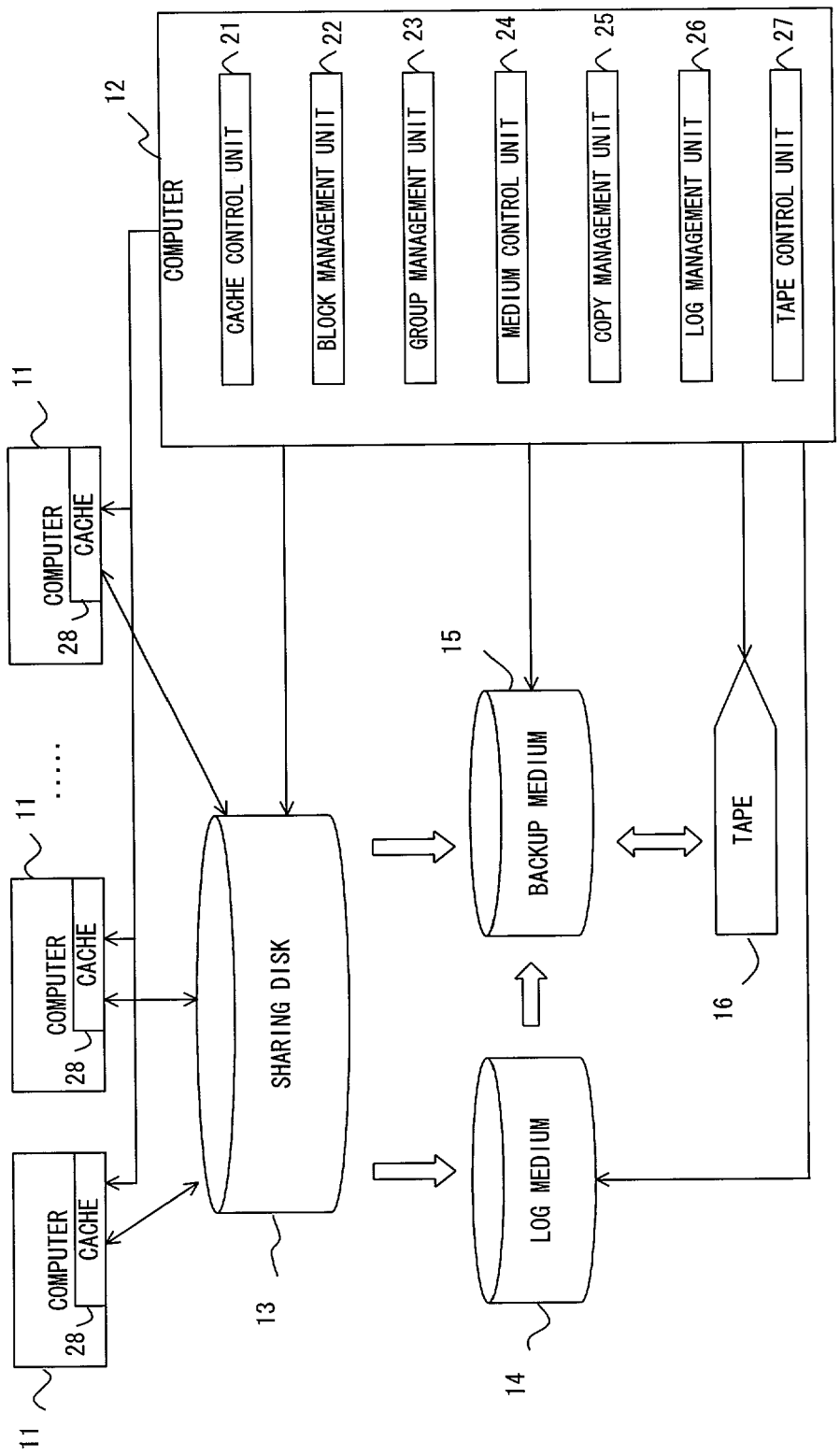
FIG. 2 is a diagram showing the configuration of a cluster system.

The following is the explanation of embodiments of the present invention by referring to the drawings.

FIG. 1 is a diagram showing the principle of a backup system of the present invention.

In the first aspect of the present invention, a backup system is provided with a copy device 1 and control device 2, and backs up a sharing medium 4 shared by a plurality of computers 3.

The copy device 1 copies a plurality of unit areas of the sharing medium 4 in a backup medium 5 as a batch. The control device 2 manages the write data that each computer 3 writes in the sharing medium 4 and reflects the write data of each computer 3 on the sharing medium 4 at the time of a backup process.

Each computer 3 holds write data as a write cache, when the data of the sharing medium 4 is changed, and writes the contents in the sharing medium 4 when the access to the sharing medium 4 became possible. The control device 2 manages the presence of the write data held by each computer 3, and performs a writing control process of the write data held by each computer 3 in the sharing medium 4.

A storage area of the sharing medium 4 is divided, for example, in the units of areas like blocks. The copy device 1 copies a plurality of unit areas of the sharing medium 4 as a batch in the backup medium 5 using a method such as the image backup method after all the write data has been written.

According to such a backup method, the backup process of the sharing medium 4 can be performed effectively, including the write data held by each computer 3 in a disk shared file system.

In the second aspect of the present invention, a backup system is provided with a log management device 6 and formation device 7, and backs up the sharing medium 4 shared by a plurality of computers 3.

When anyone of the computers 3 accesses the sharing medium 4, a log management device 6 manages the original data before an access occurs, as a log, and forms an entire log gathering the logs of two or more computers 3. After that, the formation device 7 forms the data at the start of the backup process using the entire log.

When the computer 3 changes the data of the sharing medium 4, the original data before changed is stored as a log. The log management device 6 controls the log of each computer 3, and forms the log of the entire system gathering logs of two or more computers 3. The formation device 7 determines the contents at the start point of a backup process, for example, by writing the entire log over the backup data of the sharing medium 4.

According to such a backup system, the original data that is stored upon the change of the data made by a plurality of computers 3, is edited, so that the entire log is formed. Accordingly, a backup process can be effectively performed during the operation of a system even in the disk shared file system.

In the third aspect of the present invention, a backup system is provided with the copy device 1 and a group management device 8, and performs a backup process of the sharing medium 4 shared by a plurality of computers 3.

The group management device 8 groups the files stored in the sharing medium 4, and lists the unit areas occupied by the files included in the group. The copy device 1 copies a plurality of the listed unit areas in the backup medium 5 as a batch.

The group management device 8 sets a group having one or more files, and lists unit areas occupied by the respective files included in the group. The copy device 1 copies a plurality of the listed unit areas in the backup medium 5 as a batch, without distinguishing the respective files using a method like the image backup method, for example.

According to such a backup system, it becomes possible to designate a file to be backed up in the disk shared file system, and accordingly a file which is not required need not be copied, thereby economizing the backup process.

In the fourth aspect of the present invention, a backup system is provided with the copy device 1 and an area management device 9, and backs up the storage medium 4 for storing files accessed by the computers 3.

The area management device 9 determines whether each unit area is being used for each unit area of the storage medium 4, and lists the unit areas which are being used. The copy device 1 copies a plurality of the listed unit areas in the backup medium 5 as a batch.

The area management device 9 manages each unit area of the storage medium 4, determines whether each unit area is being used as a file, and lists the unit areas occupied by the file. Then, the copy device 1 copies a plurality of the listed unit areas in the backup medium 5 as a batch, without distinguishing respective files using a method like the image backup method, for example.

According to such a backup system, it is not required to copy the unit area that is not being used as a file. Therefore, the backup process in the file system is economized.

In the fifth aspect of the present invention, a backup system is provided with the copy device 1 and the area management device 9, and backs up the storage medium 4 for storing the file accessed by the computers 3.

The area management device 9 lists the unit areas that have been changed after the previous backup process among the unit areas of the storage medium 4 as a difference. The copy device 1 copies a plurality of the listed unit areas in the backup medium 5 as difference backup data as a batch.

The backup system performs the backup process of the storage medium 4 in a time series with proper timing. The area management device 9 manages each unit area of the storage medium 4, and lists unit areas changed after the previous backup process or after the unit areas newly used as files. Then, the copy device 1 copies a plurality of the listed unit areas in the backup medium 5 as a batch, without distinguishing each file using a method like the image backup method. Thus, only the changed unit area is stored as a difference.

According to such a backup system, it is not required to copy the unit area of which the data has not been changed after the previous backup process. Therefore, the backup process in the file system is economized.

For example, the sharing medium 4 of FIG. 1 corresponds to the sharing disk 13 of FIG. 2 that will be described later, and the backup medium 5 of FIG. 1 corresponds to a backup medium 15 or tape 16 of FIG. 2. Further, for example, the copy device 1 of FIG. 1 corresponds to a copy management unit 25 of FIG. 2, the control device 2 of FIG. 1 corresponds to cache control unit 21 of FIG. 2, the log management device 6 of FIG. 1 corresponds to a log management unit 26 of FIG. 2, the formation device 7 and also area management device 9 of FIG. 1 correspond to a block management unit 22 of FIG. 2, and the group management device 8 of FIG. 1 corresponds to a group management unit 23 of FIG. 2.

A computer system of the present embodiments is provided with a plurality of computers, a sharing disk shared by the computers, and a file system enabling the computers to access the sharing disk simultaneously.

In the computer system, all the contents of the disk are copied in the medium used for a backup process, using the improved image backup method, on the occasion of the backup process of data. Further, the access of the computer to the disk is detected, and the original data before an access occurs is stored in a log medium. Then, the image (contents of the data) at the start point of a backup process is determined, using the data stored in the log medium. In the following, the original data is referred to as Before Image Log (BI log) or only a log.

In the image backup method of the present embodiments, the main characteristics regarding the backup process are as follows:

(a. 1) The inconsistent state of the data inside a cluster will not generate by managing the contents of a write cache on the memory of each computer, and by reflecting the contents of the write cache of each computer on a disk at the time of a backup process.

(a. 2) Each computer that is going to write data on a disk leaves a BI log, and BI logs of a plurality of computers are merged at the time of a backup process. In this way, the breakdown of the data caused by the write cache during the backup process (copy process) can be prevented by determining data using the edited log of an entire system which is obtained by gathering all the logs after the termination of the backup process.

(a. 3) Each computer that is going to write data on a disk notifies a writing process to a specific computer that has a responsibility for the BI log, so that the computer controls the BI log. In this way, logs of a plurality of computers are sent to a specific computer to be merged, and the merged log is stored in a log medium. By determining data using this log, the breakdown of the data caused by the write cache during a backup process can be prevented.

(a. 4). As a medium for storing a BI log, a medium same as the backup data is selected. In this way, a log can be stored at the same time as the backup process.

(a. 5) As a medium for storing a BI log, a medium different from the backup data is selected. Thus, logs can remain even in the case that a medium for storing backup data cannot be overwritten.

(a. 6) A BI log is written over the backup data to be stored in the backup medium. In this way, a plurality of media need not be referred to at the time of the restoring process.

(a. 7) The address information of backup data to be overwritten is written in a BI log in advance. Thus, it becomes possible to write the log over the backup data only by reading the log, without accessing the management information of the log.

(a. 8) The used blocks on a disk are listed among from blocks, and only required part is copied. In this way, a copy time and required medium capacity can be decreased since a data amount to be copied decreases.

(a. 9) Blocks which have been changed after the previous backup process (differences) are listed among the used blocks on a disk, and only the changed part is copied. This difference backup process can decrease the amount of data to be copied, so that a copy time and required medium capacity can be also decreased.

(a. 10) After the termination of the backup process and before the restoring process, the contents of pieces of difference backup data, produced by the difference backup process, are merged in the units of blocks, or the contents of difference backup data and entire backup data are merged in the units of blocks. Thus, the restoring process can be economized by gathering the pieces of the difference backup data.

(a. 11) A record start point of the difference backup data is made to be selective. At the time of the restoring process, a flexible restoring process becomes possible by using only the difference backup data after the selected point, thereby neglecting the change made before the selected point.

(a. 12) The copy process of a disk is dispersed to a plurality of computers inside a cluster. In this way, the load is dispersed, so that the copy time is shortened.

In the image backup method of the present embodiments, the main characteristics regarding the grouping of files are as follows:

(b. 1) Files are grouped, and blocks occupied by the files included in the groups, are managed. At the time of a backup process, only the blocks used by the files are copied. Thus, files can be grouped, and also files can be backed up in the units of groups.

(b. 2) Files are grouped in the units of directories, and all the files included in the directories are set as groups. Thus, files can be grouped, and also files can be backed up in the units of groups.

(b. 3) A specific file or directory below the directory designated as a group is removed from the group. In this way, a specific file that is included in a directory designated as a certain group can be removed from the group, so that a flexible group setting process becomes possible.

(b. 4) A plurality of groups are set, and each of the groups is backed up with a different schedule. In this way, flexible group setting and backup processes become possible.

(b. 5) It is admitted that one file belongs to a plurality of groups. In this way, flexible group setting and backup processes become possible.

In the image backup method of the present embodiments, the main characteristics regarding the restoring process are as follows:

(C. 1) A file system is provided with a medium for storing backup data as it is instead of a disk. In this way, the system can access the medium for storing backup data instead of a disk, so that a special process for a restoring process is not required.

(c.2) In the case that the above-mentioned difference backup process is performed, the backup data of each generation is searched for and traced up to the entire backup data, if necessary. When the block of a file is not included in the latest difference backup data, the block stored by the previous backup process can be referred to and also can be used. Therefore, it becomes possible to make a user recognize that all the pieces of data exist at the time of the restoring process.

(c. 3) Only the required blocks are loaded from a backup tape into a disk to be used as a buffer, and these blocks are used as caches. Thus, only the required blocks can be installed on a buffer, so that the access efficiency to a frequently-accessed block is enhanced.

(c. 4) Only the required block is loaded into a disk from a backup tape, and the data is represented to a computer that is not connected with the tape. In this way, even the computer that does not have a tape inside a cluster can read the backup data that is stored on the tape.

(c. 5) In the case that the BI log is not written over the backup data, the BI log is referred to first, and the backup data is referred to later, if necessary. In the case that a log and backup data are stored in the medium separately, the existence and contents of the log are confirmed, and the log is referred to if the log exists, while the backup data is referred to if the log does not exist. In this way, contradiction will not generate in the restored data.

FIG. 2 shows a configuration of a cluster system for performing the above-mentioned image backup method. A cluster system of FIG. 2 includes a plurality of computers 11 and 12, the sharing disk 13, a log medium 14, the backup medium 15, and the tape 16.

The plurality of computers 11 shares the sharing disk 13, and perform data processes while accessing the files stored in the sharing disk 13. The computers 11 and 12, and the sharing disk 13 configure a cluster, and generally one or more sharing disks 13 are installed in the cluster. The log medium 14 stores a BI log of the computer 11, and the backup medium 15 and the tape 16 store the backup data of the file inside the disk 13.

The computer 12 is used to manage a cluster, and includes the cache control unit 21, block management unit 22, group management unit 23, a medium control unit 24, the copy management unit 25, log management unit 26, and a tape control unit 27. These management units and control units correspond to software described by programs, for example, and the block management unit 22 corresponds to a main part of the file system.

The cache control unit 21 controls the cache 28 installed on the memories of the respective computers 11. In the cache 28, the data written by the computer, regarding the file of a cluster stored in the disk 13, is stored temporarily.

The cache control unit 22 allocates a block to a file, and manages which address of which disk 13 each block of files is allocated to. The group management unit 23 controls the group designated by a user and the filed included in the group.

The medium control unit 24 controls the access to the backup medium 15, and the copy management unit 25 controls a copy process of data from the disk 13 to the backup medium 15. The log management unit 26 controls the BI log of each computer 11 and log medium 14, and the tape control unit 27 controls the access to the tape 16.

According to the cluster system, the block management unit 22 controls the blocks of a backup file to be backed up on the disk 13, and the copy management unit 25 copies those blocks in the backup medium 15, so that a backup process is performed. The BI log based on the writing process of each computer 11 inside the cluster, which occurs during the copying is copied in the log medium by the log management unit 26. The BI log stored in the log medium is reflected on the backup medium 15 later or it is stored unchanged in a log format.

The log medium 14 and the backup medium 15 are nonvolatile media. In the case that the backup medium 15 is a disk, it is used as a buffer for the tape 16, and the tape control unit 27 copies backup data in the tape 16 from the backup medium 15.

First, the processes regarding the above-mentioned characteristics (a. 1) to (a. 7) will be explained in detail referring to FIGS. 3 to 16.

The cache control unit 21 performs a cache control process of (a. 1), and reflects the write data (write cache) inside the cache 28 on the disk 13 at the time of a backup process. The cache control unit 21 controls a cache table that registers following information about all the caches 28 in a cluster.

computer name file name area (offset, size) inside a file

Is a cache dirty or not? (Does the write data remain without being reflected on the disk 13 or not?)

When a certain computer 11 forms a dirty cache, the cache control unit 21 instructs each computer 11 to discard a write cache that the other computers 11 have regarding the area corresponding to the corresponding file. Further, the unit 21 instructs each computer 11 to write all the dirty caches on disk 13 at the time of a backup process. The computer 11 to which the writing-out process is instructed, writes the write cache inside the cache 28 on the disk 13.

When all the write caches are reflected on disk the 13 inside the cluster, the image backup method is performed by the copy management unit 25, and the data inside the disk 13 is copied in the backup medium 15. In this way, a backup process is performed without generating the inconsistency of the data inside a cluster.

Figure 3:
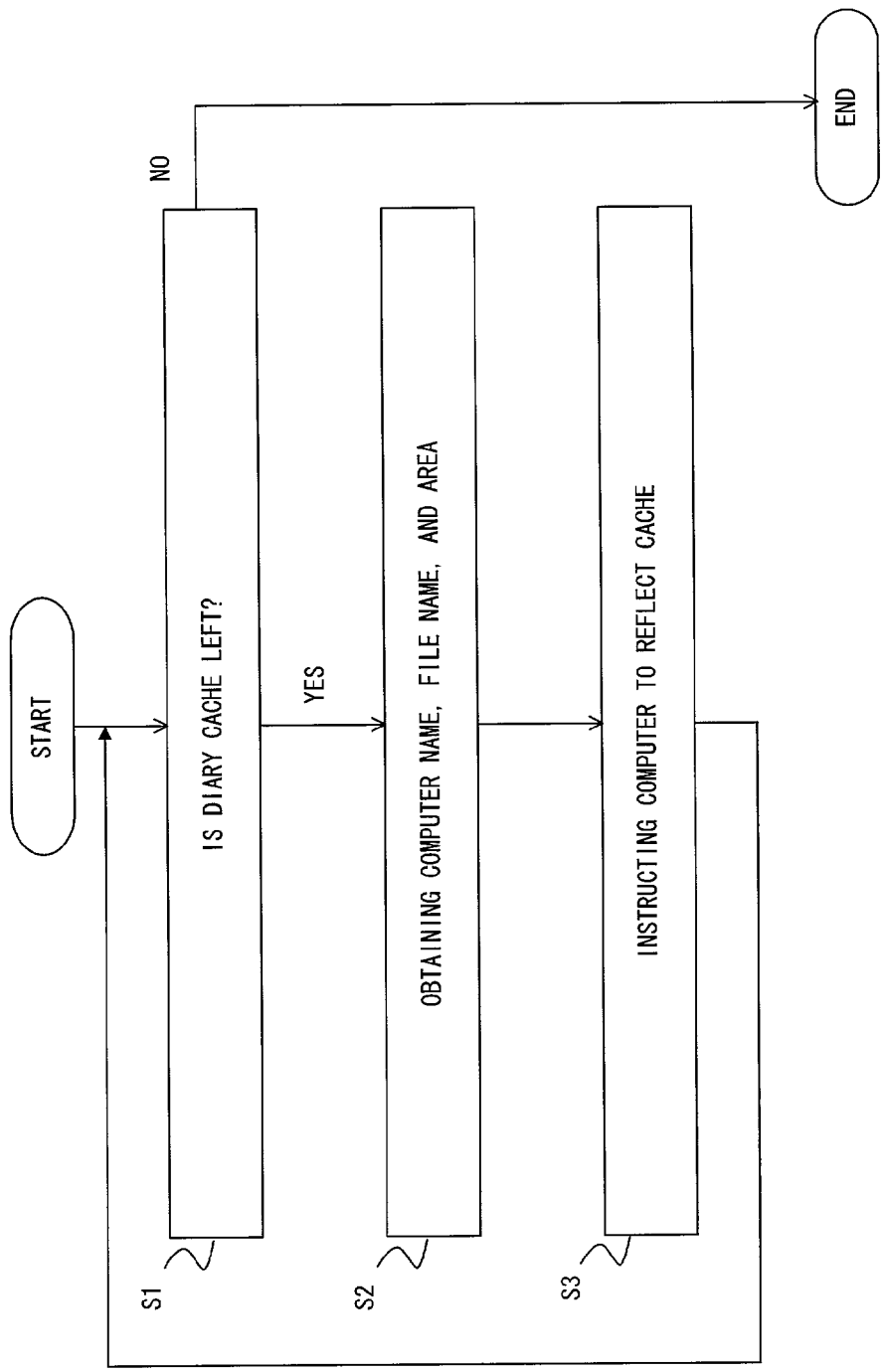
FIG. 3 is a flowchart showing a cache control process.

FIG. 3 is a flowchart showing a process of reflecting a write cache on the disk 13 by the cache control unit 21. When a backup process starts, the cache control unit 21 first searches for a cache table, and checks whether a dirty cache remains in a cluster (step S1).

If the dirty cache remains, the computer name, and information about the file name and area in which data is written are obtained (step S2). Next, the unit 21 instructs the computer to reflect the dirty cache on the area corresponded by the file which is also corresponded by the disk 13 (step S3), and repeats processes in and after step S1. When a dirty cache disappears in step S1, processes terminate.

The log management unit 26 performs the log management of (a. 2) or (a. 3) regarding a BI log.

FIG. 4 shows the log management of (a. 2). In FIG. 4, each computer 11 has a temporary log medium 31 and log control file 32 of its own. The log management unit 26 gathers the logs of all the computers 11 after the termination of a backup process to edit the log of the entire system, and it stores the log in the log medium 14. In the log management file 32, a log list that records the information like the following is included.

device name of the disk 13
area (offset, size)
time

Among these, time indicates the time when a log is formed, and time is used to determine the sequential relationship between the formed log and the other log. Here, instead of the real time, a logical time generated by a clock unit 33 provided with the computer 12 is used. The clock unit 33 forms a logical time "1", for example, when the first log is formed. After that, the unit 33 increments the logical time by one whenever a log is formed.

Each computer 11 sends a log of the temporary log medium 31 and a log list of the log management file 32 to the log management unit 26. The log management unit 26 preferentially leaves the oldest log to edit the logs, if there are a plurality of logs with the same area in the received logs. By writing the thus-edited log over the backup medium 15, the image at the backup start point is determined, so that the change made by writing a log on the disk 13 during the backup process can be cancelled.

Figure 5:
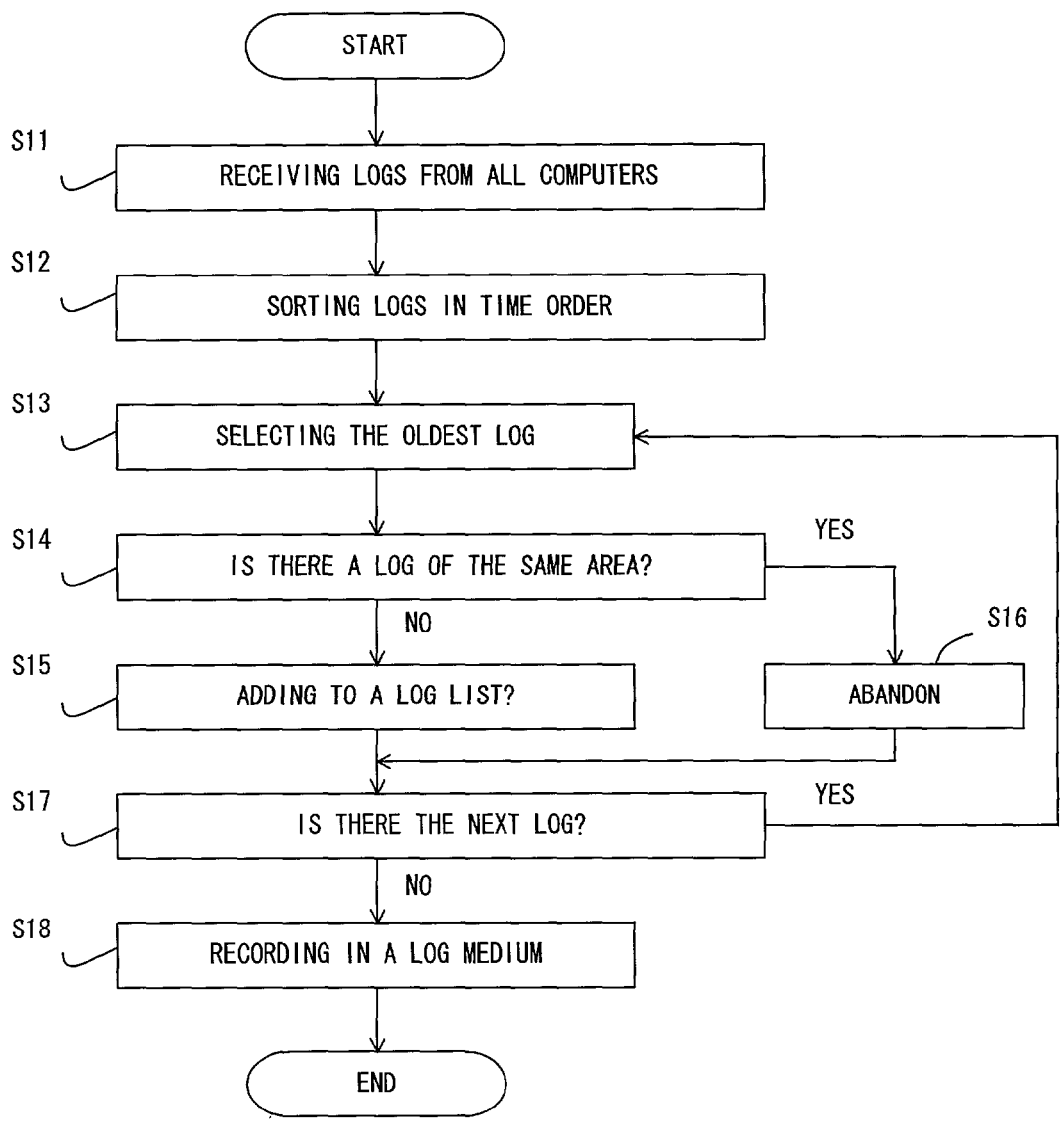
FIG. 5 is a flowchart showing a log edition process.

FIG. 5 is a flowchart showing a log edition process performed by the log management unit 26. The log management unit 26 first receives logs and log lists from all the computers 11 inside the cluster (step S11), and sorts the received logs in the order from earlier time, so that a log list for work is prepared (step S12)

Next, the log management unit 26 selects the oldest log (step S13), and checks whether a log with the same area as that of the oldest log exists in the list for work (step S14). If a log with the same area does not exist, the selected log is added to the log list for work (step S15), and if such a log exists, the selected log is discarded (step S16).

Next, the log management unit 26 checks whether an not-selected log exists (step S17), and repeats processes in and after step S13 if such a log remains. When the log management unit 26 selects all the logs, it records the logs that are included in the log list for work, in the log medium 14 (step S18), thereby terminating processes.

FIG. 6 shows the log management process of (a. 3). In FIG. 6, each computer 11 sends a log to the log management unit 26. The log management unit 26 records the received log in the log medium 14, and records the corresponding device name and also area (offset, size) in the log control file 34. Thus, the log is put in the log medium 14 from the beginning in the log control management process of FIG. 6. By writing the recorded log over the backup medium 15, the image at the backup start point is determined.

Figure 7:
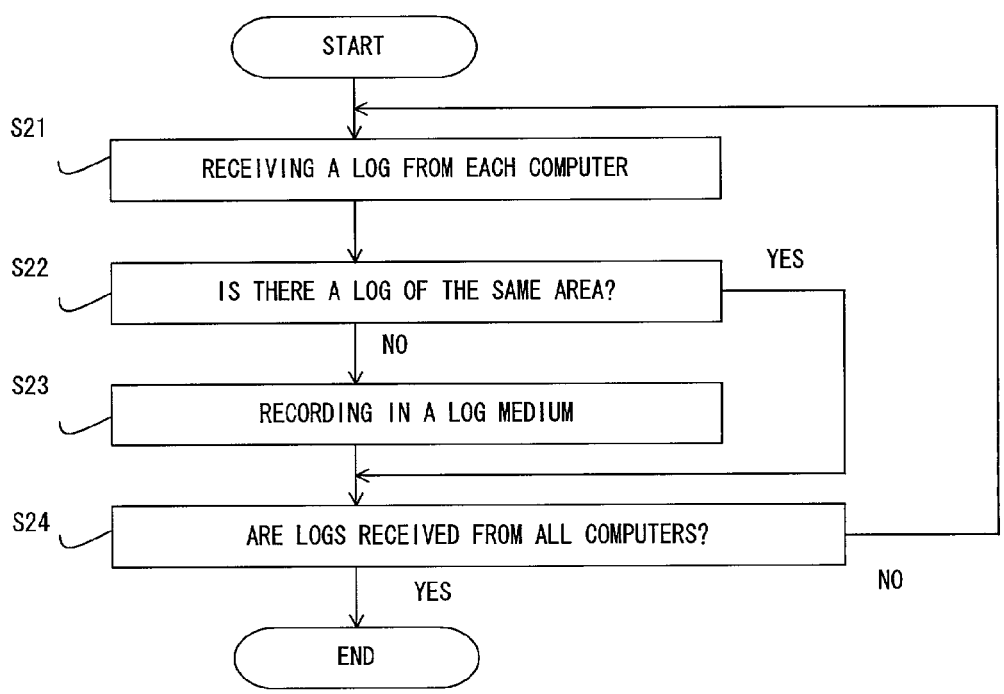
FIG. 7 is a flowchart showing the first log record process.

FIG. 7 is a flowchart showing a log record process by the log management unit 26. The log management unit 26 first receives a log from the computer 11 inside the cluster (step S21), and checks whether a log with the same area as that of the received log is already stored in the log medium 14 (step S22). If a log with the same area is not stored, the received log is recorded in the log medium 14 (step S23), and if a log with the same area is stored, the received log is not recorded.

Next, the log management unit 26 checks whether logs are received from all the computers 11 inside the cluster (step S24). If there is the computer 11 that has not sent a log, the log management unit 26 repeats processes in and after step S21, and terminates processes when it receives logs from all the computers 11.

In the log management process of FIG. 4, the system has such an advantage that the communication cost is small, since logs of the respective computers 11 are collectively sent to the log management unit 26 after the termination of a backup process. However, since the temporary log medium 31 is required, hardware increase, and since logs must be edited after the termination of a backup process, after-treatment becomes required.

On the contrary to the above-mentioned process, in the log management of FIG. 6, the system has such an advantage that the temporary log medium 31 and after-treatment are not required. However, a communication cost increases more than the case of FIG. 4, because a log is sent to the log management unit 26, whenever a log occurs in each computer 11.

The log management of FIG. 6 can be further classified into the log management process of (a. 4) or (a. 5). In the log management process of (a. 4), a log is stored in the backup medium 15 instead of the log medium 14. In the log management process of (a. 5), a log is stored in the log medium 14.

Figure 8:
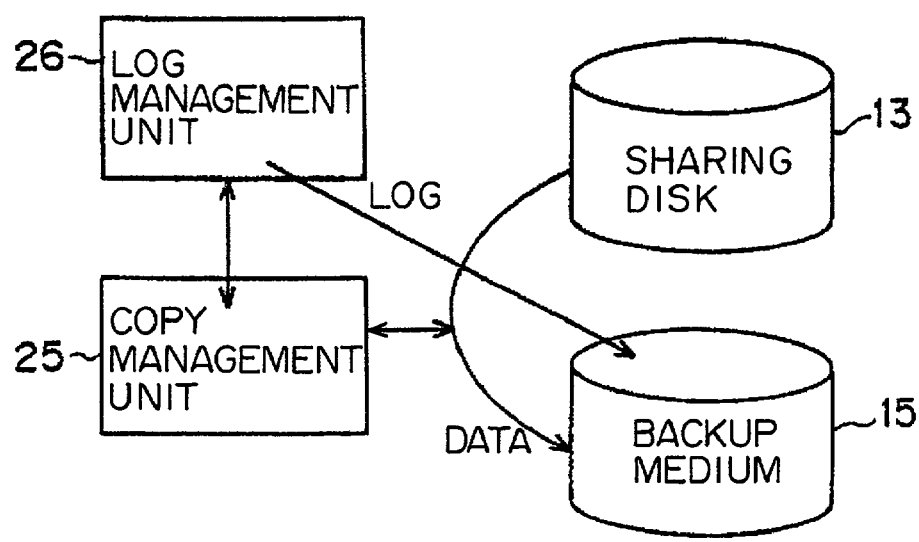
FIG. 8 is a diagram showing the third log management.

FIG. 8 shows the log management process of (a. 4). In the case that the backup medium 15 in which the disk 13 is copied is not a tape but a disk used as a buffer for the tape 16, the backup medium 15 can be partially overwritten. Then, by the coordination of the copy management unit 25 and log management unit 26, a log can be recorded in the backup medium 15 at the same time of copying the disk 13 to be backed up.

At that time, after the log management unit 26 records the log in the backup medium 15, the copy management unit 25 copies the data of the disk 13 in the backup medium 15, regarding the area where a log does not exist.

Figure 9:
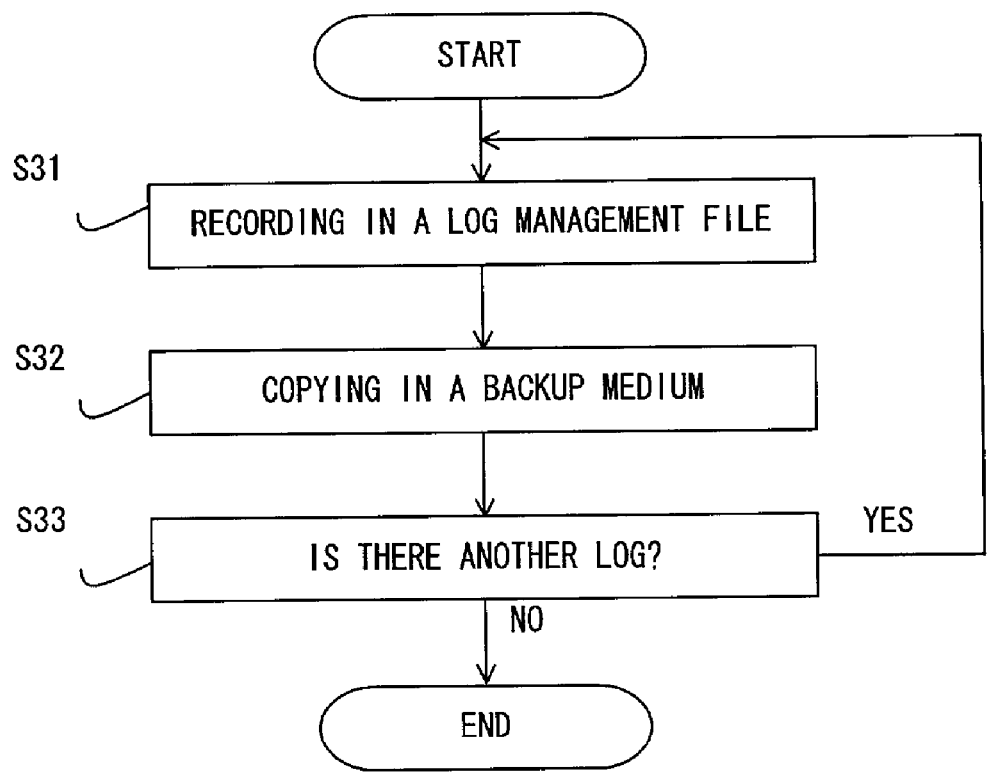
FIG. 9 is a flowchart showing the second log record process.

FIG. 9 is a flowchart showing a log record process by the log management unit 26. The log management unit 26 first records the management information of a log to be stored in the log control file 34 as shown in FIG. 10 (step S31), and it copies the log in the backup medium 15 (step S32). Next, the log management unit 26 checks whether there is another log that has not been copied (step S33), and if there is such a log, it repeats processes in and after step S31. When all the logs have been copied, the unit 26 terminates processes.

In the log management file of FIG. 10, the device name, original address, and length are recorded for each log. The device name indicates the identification information of the corresponding disk 13, while the original address and length indicate the offset and size of the corresponding area, respectively.

Figure 11:
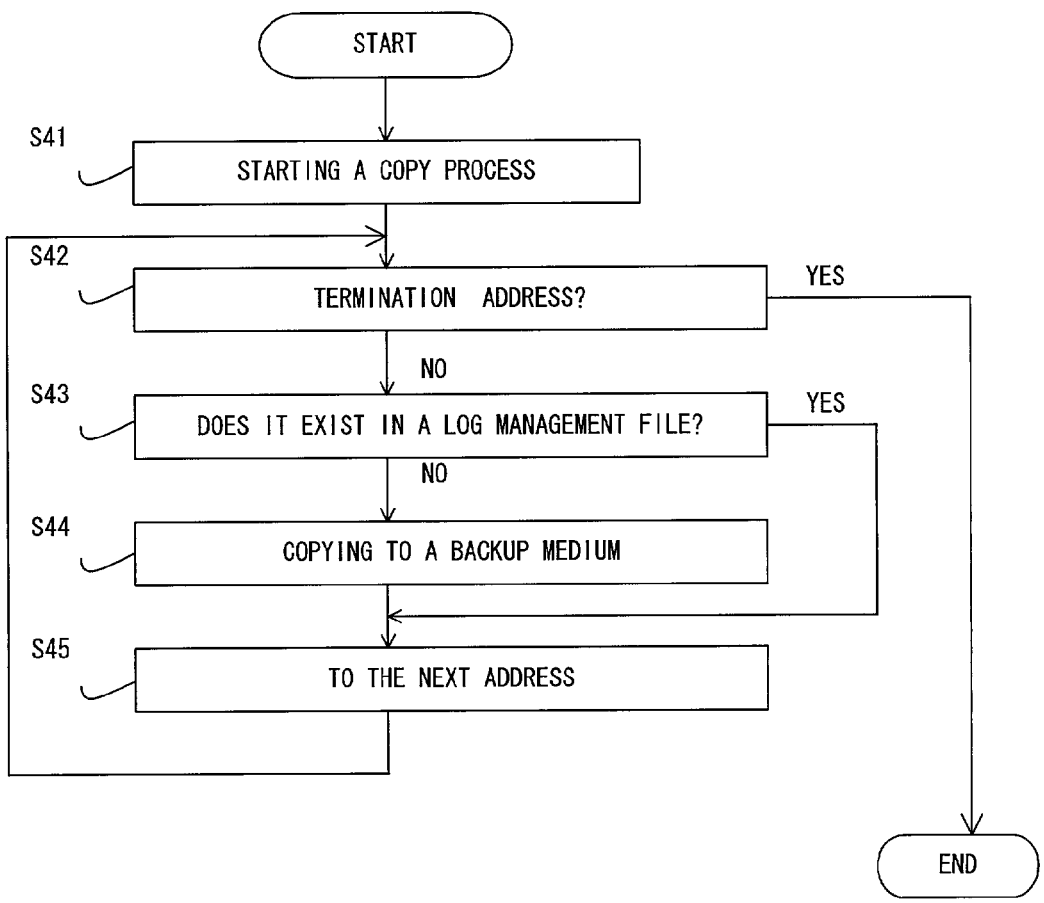
FIG. 11 is a flowchart showing the first copy process.

FIG. 11 is a flowchart showing a copy process performed by the copy management unit 25. First of all, the copy management unit 25 starts a copy process setting the start address of the disk 13 to be backed up as a present address (step S41), and it checks whether the present address is a termination address (step S42).

If the present address is not a termination address, the log management unit 26 checks whether the address exists in the log control file 34 (step S43). If the present address does not exist in the log control file 34, the block of the address is copied in the backup medium 15 (step S44). If the present address exists in the log control file 34, the block of the address is not copied.

Figure 12:
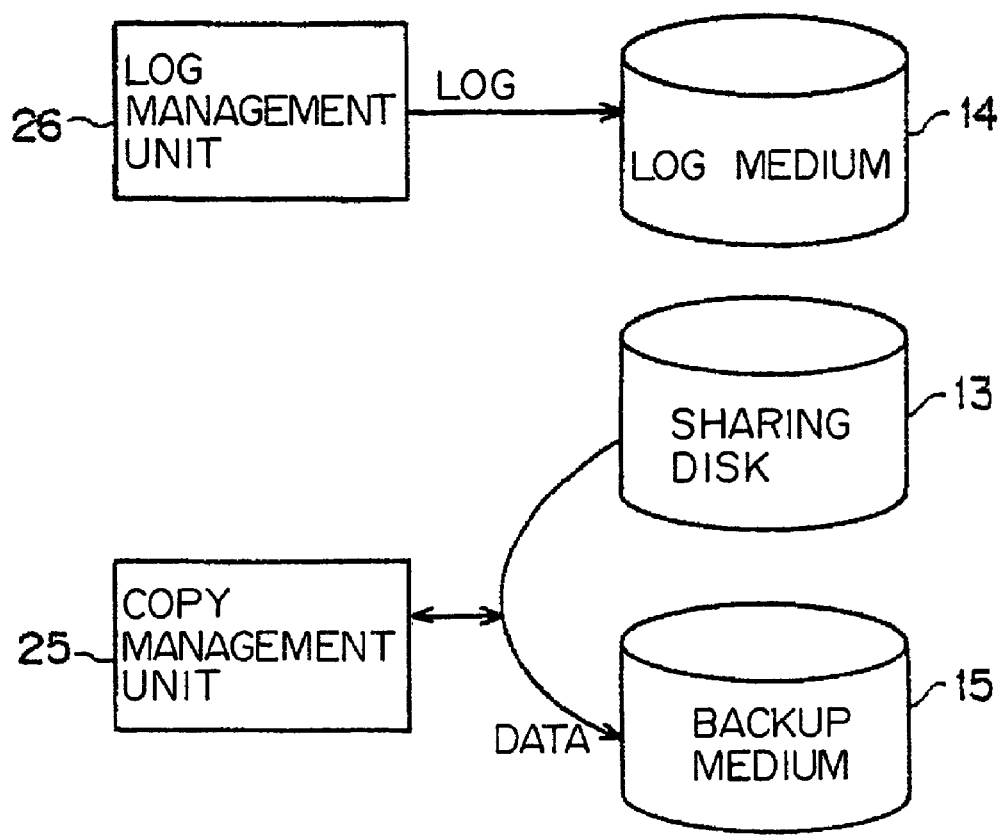
FIG. 12 is a drawing showing the fourth log management.

Next, the log management unit 26 sets the next address as a present address (step S45), and repeats processes in and after step S42. When the present address agrees with a termination address in step S42, processes terminate FIG. 12 shows the log management process of (a. 5). In the case that the backup medium 15 cannot be partially over-written like a tape, the log medium 14 different from the backup medium 15 is prepared, so that only a log is written over the log medium 14. In this way, a log can be left on a different medium from the backup medium 15. At this time, the log management unit 26 and copy management unit 25 record the log and copy the disk, respectively.

FIG. 13 is a flowchart showing the log record process performed by the log management unit 26. The processes in steps S51 and S53 of FIG. 13 are the same as the processes of steps S31 and S33 of FIG. 9, respectively. After the process of step S51, the log management unit 26 copies a log in the log medium 14 (step S52), and performs the process in step S53.

FIG. 14 is a flowchart showing the copy process performed by the copy management unit 25. The processes in steps S61, S62, S63 and S64 of FIG. 14 are the same as those in steps S41, S42, S44 and S45 of FIG. 11, respectively. In this case, all the blocks of the disk 13 to be backed up are copied in the backup medium 15.

In the log management process of (a. 6), the log management unit 26 stores a BI log after it writes the log over the backup medium 15 at the time of a backup process. If a log and backup data are previously merged to be stored, it is sufficient to refer to only the backup medium 15 at the time of the restoring process, so that a plurality of media need not be referred to. Therefore, the restoring process is economized.

Figure 15:
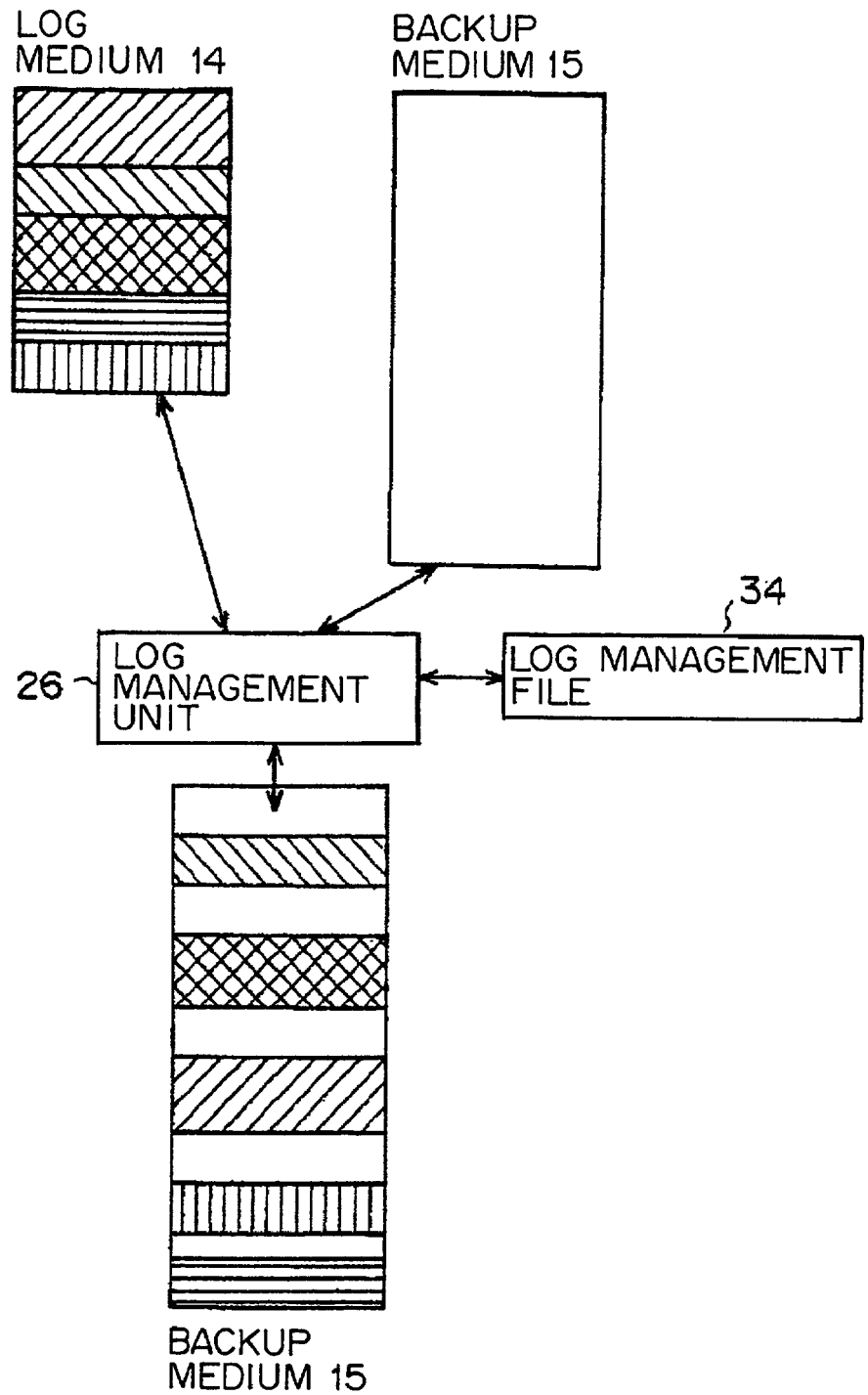
FIG. 15 is a drawing showing the fifth log management.

FIG. 15 is a diagram showing the log management process of (a. 6). In, FIG. 15, the log management unit 26 respectively writes a plurality of logs of the log medium 14 over the corresponding areas of the backup medium 15 while referring to the log management file 34, and it merges the logs and backup data. After that, the data of the backup medium 15 is stored on the tape 16 by the tape control unit 27.

In the log management process of (a. 7), the log management unit 26 records the address information of backup data over which a log is written, together with the data of a BI log at the time of a backup process. Originally, a log cannot be accessed without referring to a log management file being the management information of a log. If the management information is written in a log once, however, the log can be written over the backup data only by reading the log. Therefore, it becomes possible to cancel a log, even if the management of the log is referred to, so that a log management process is economized.

FIG. 16 is a table showing the data format of such a log medium. In FIG. 16, an original address and length indicate the offset and size of the area over which a log is written, and these correspond to the management information of the log.

Next, the characteristics (a. 8) to (a. 12) and processes regarding (b. 1) to (b. 5) that are mentioned above are explained in detail, while referring to FIGS. 17 to 27.

Figure 17:
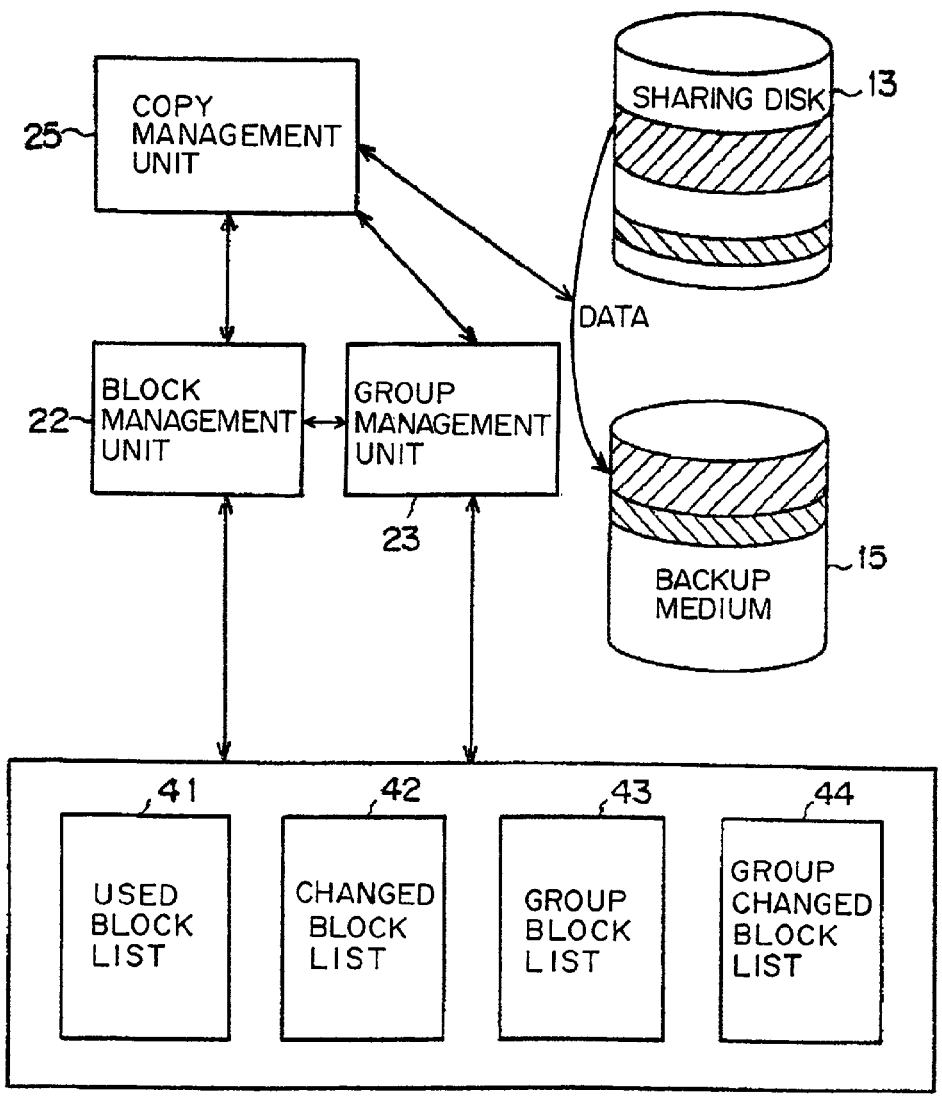
FIG. 17 is a diagram showing block management and group management.

FIG. 17 is a diagram showing the block management processes of (a. 8) and (a. 9), and the group management processes of (b. 1) to (b. 5). A used block list 41 is used in the block management process of (a. 8), and a change block list 42 is used in the block management process of (a. 9). A group block list 43 and group change block list 44 are used in the group management processes of (b. 1) to (b. 5).

In the block management process of (a. 8), the block management unit 22 records a file allocated on the disk 13, in the used block list 41, thereby managing the recorded block. Then, the block management unit 22 notifies the block that is recorded in the used block list 41, to the copy management unit 25, so that the copy management unit 25 copies only the notified block. In this way, by copying only a required block as backup data, the copy time is shortened, and also the required medium capacity is decreased.

Figure 18:
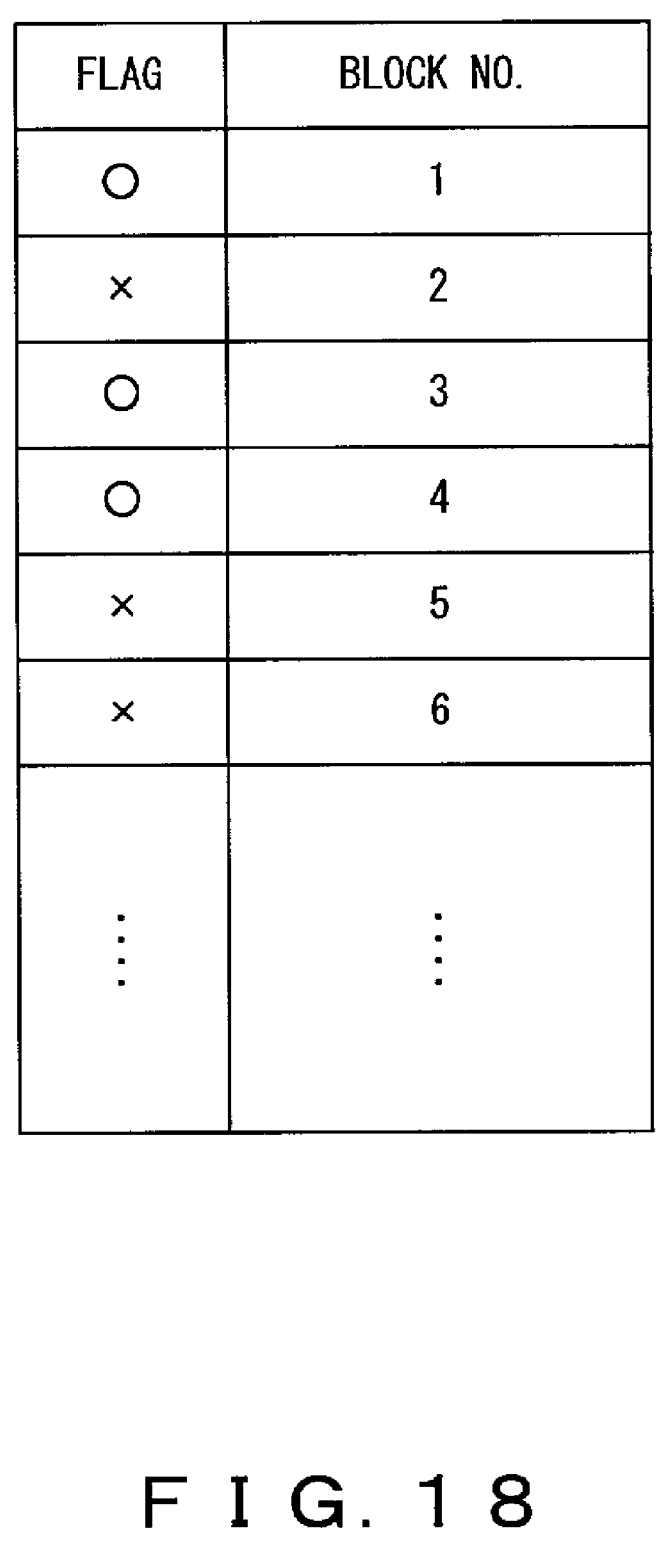

The used block list 41 is formed by the empty area control table as shown in FIG. 18. The empty area control table of FIG. 18 is managed by the block management unit 22, and it has the block identification information (block number) about all the blocks of the disk 13 and the flag information indicating whether each block is being used. Here, a flag "E" indicates an empty block, while a flag "X" indicates that the block is being used.

Figure 19:
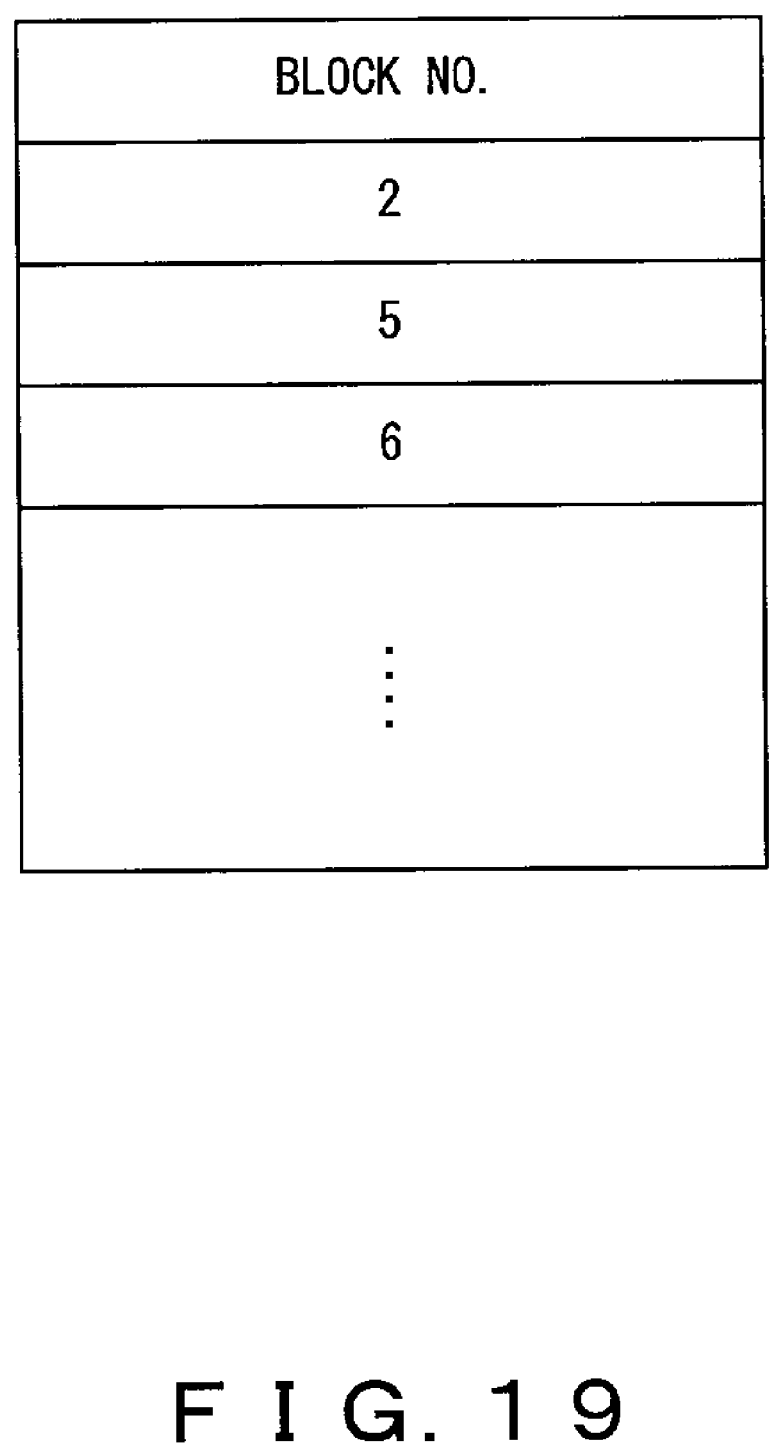

The block management unit 22 lists the block numbers of being-used blocks from the empty area control table at the time of a backup process, and forms the used block list 41. For example, the used block list as shown in FIG. 19 is formed by the empty area control table of FIG. 18.

In the block management process of (a. 9), the block management unit 22 records, in the change block list 42, the block which is changed after the previous backup process among the blocks on disk 13, thereby managing the recorded block. Then, the block management unit 22 notifies the block recorded in the change block list 42 to the copy management unit 25 as a difference, and the copy management unit 25 copies only the notified block. In this way, the difference backup process (incremental backup process) is carried out.

When a file f uses blocks x, y and z, for example, assume that an over-writing process is performed to the block z, and a block u is newly added after the previous backup process. In this case, the blocks x and u are recorded in the change block list 42, and the contents of these blocks are copied at the time of a backup process.

By performing such a difference backup process instead of performing the backup processes (entire backup processes) of all the blocks on disk 13, the copy time is shortened, and the required medium capacity is decreased.

Figure 20:
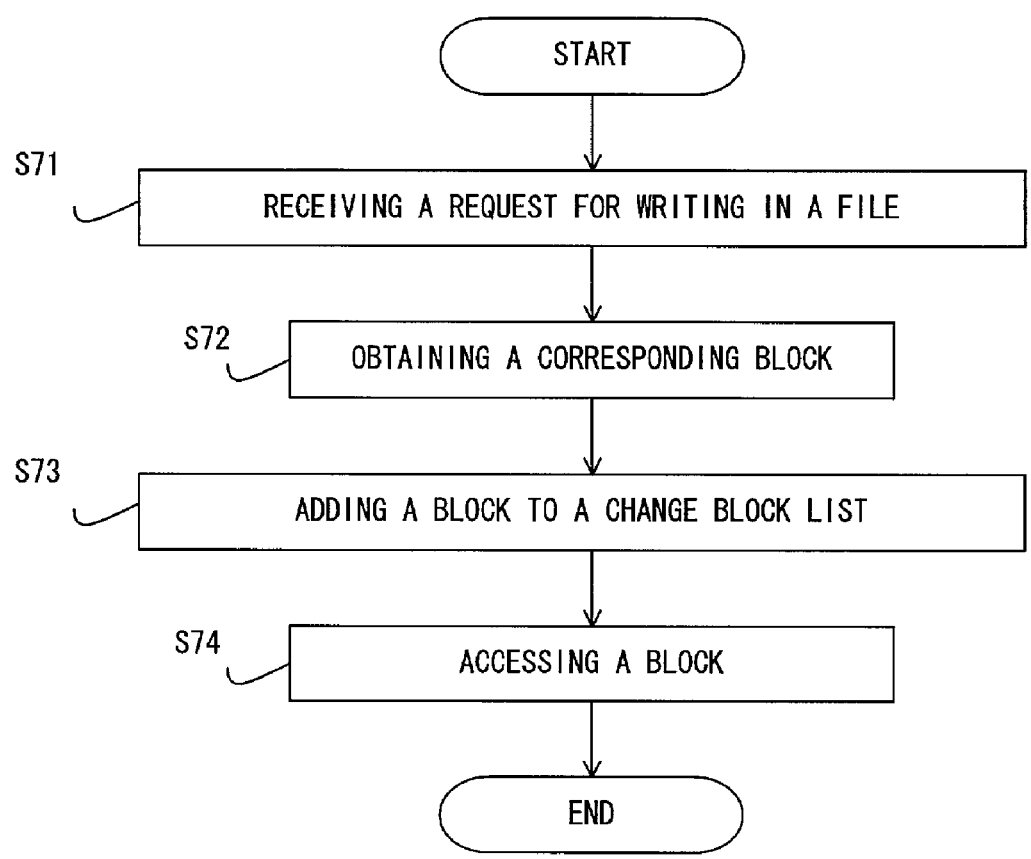
FIG. 20 is a flowchart showing an updating process of a changed-block list.

FIG. 20 is a flowchart showing an updating process of a change block list, performed by the block management unit 22. In this process, a changed block is determined from the request for writing in a file, and then the changed block is added in the change block list 42.

The block management unit 22 first receives a request for writing in a file from the computer 11 (step S71). In the writing request, a file name, and an offset a and size S of the writing area are included. Next, the unit 22 requests the block numbers of blocks that are allocated in the range of a to a+S of the corresponding file (step S72), and it adds the block numbers to the change block list 42 (step S73). Then, the unit 22 accesses the required block, performs a writing process (step S74), and terminates processes.

In the group management process of (b. 1), the group management unit 23 manages a file for each group while coordinating with the block management unit 22, and records the block being used by the file that belongs to each group, in the group block list 43 to be managed. Then, the group management unit 23 notifies the block that is recorded in the group block list 43 of a specific group, to the copy management unit 25, and the copy management unit 25 copies only the notified block. In this way, the backup process regarding a specific group is carried out.

In the group management process of (b. 2), the group management unit 23 groups files in the units of directories, so that it sets all the files included in the directories as a group.

In the group management process of (b. 3), the group management unit 23 excludes the specific file or directory under the directory that is set as a group, from the group. In this way, the specific file included in a directory that is set as a certain group, can be eliminated from the group.

A user can group optional files, and backup files in the units of groups using the above-mentioned group management processes of (b. 1) to (b. 3).

Figure 21:
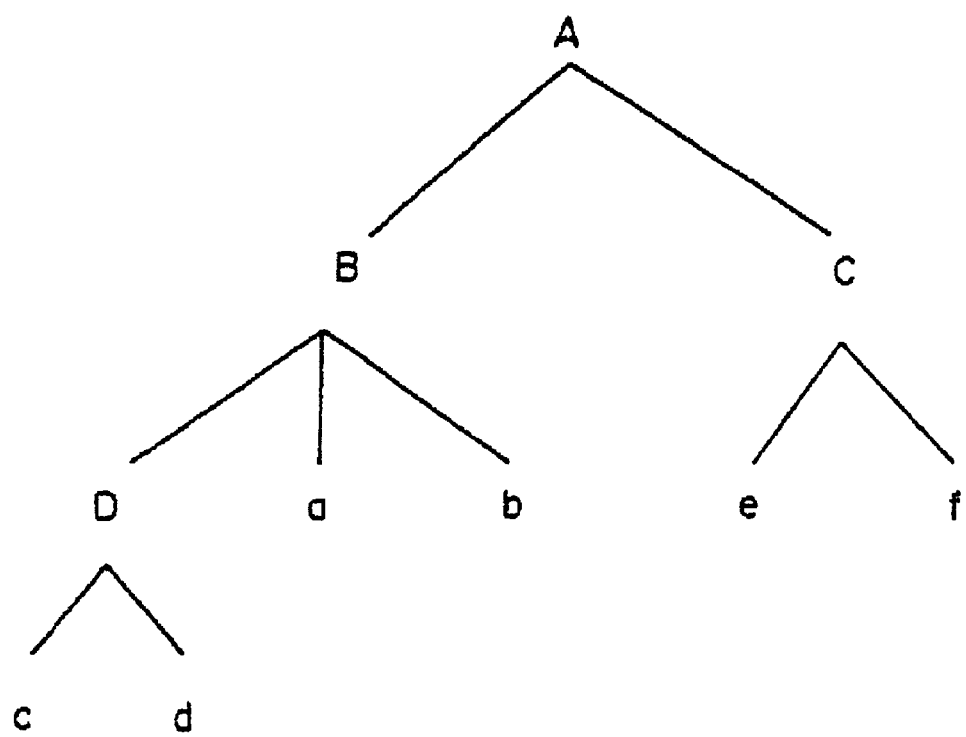
FIG. 21 is a directory tree.

Assume that a directory tree as shown in FIG. 21 exists in a file system, as an example of such a group management process. In FIG. 21, A, B, C and D indicate directory names, while a, b, c, d, e and f indicate file names. A user can set a group of files using optional directory name and file name.

Figure 22:
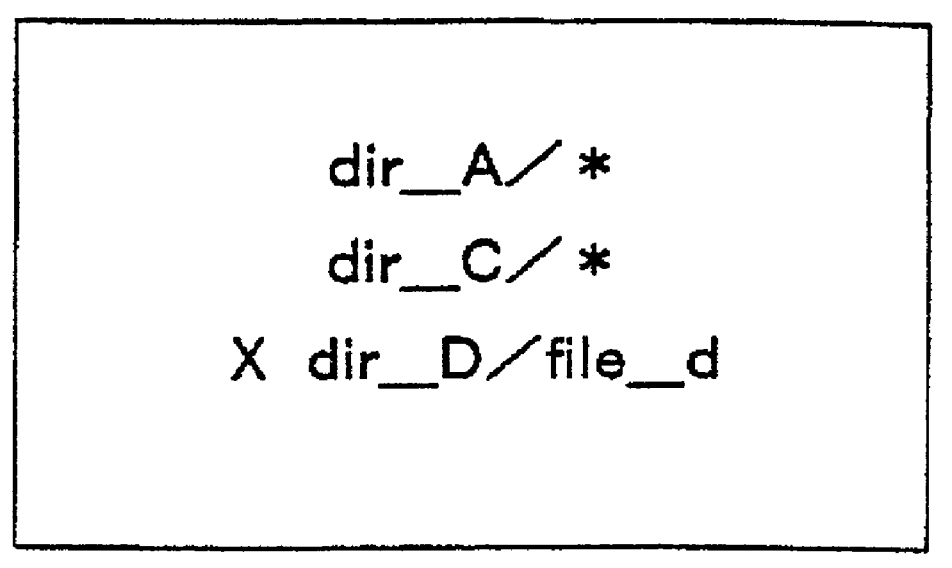

Here, assume that a user inputs a group list as shown in FIG. 22, and sets the group. "dir_A/*" and "dir_C/*" of FIG. 2 indicate that all the files of directories A and C are included in a group, while "X dir_D/file_d" shows that the file d of a directory D is eliminated from the group.

At this time, the group management unit 23 selects as a group, the remaining files a, b, c, e and f other than the file d among all the files that belong to directories A and C. Then, the unit 23 obtains the block numbers of the blocks allocated to each file from the block management unit 22, and it records the numbers in the group block list 43.

Figure 23:
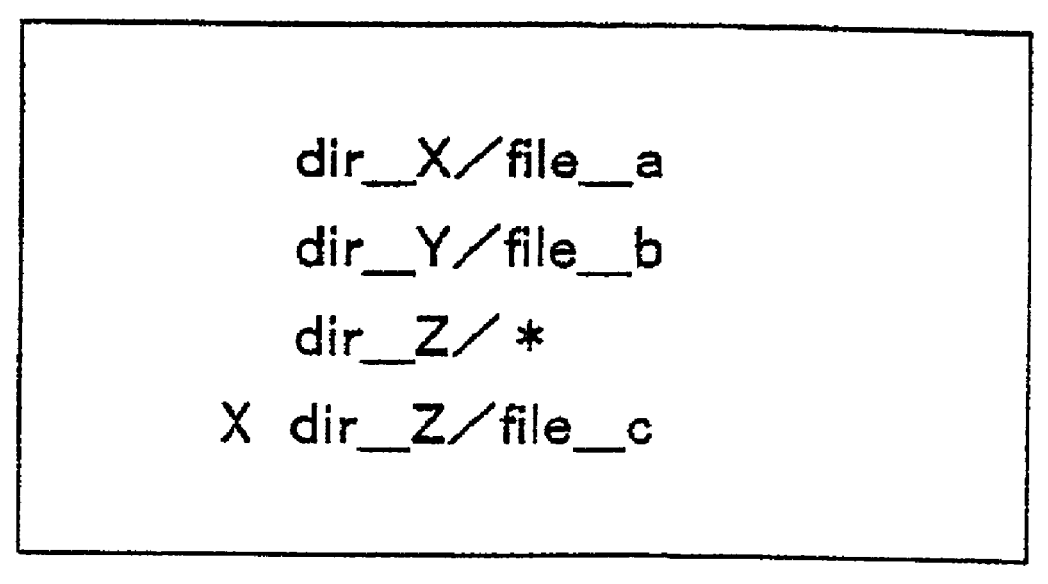

FIG. 23 shows an example of the group list regarding another directory tree. This group list indicates that file a of directory X, file b of directory Y, and all the files of directory Z are included in a group, and file c of directory Z is eliminated from the group.

From this block list, a group block list as shown in FIG. 24, for example, is formed. In FIG. 24, "blockno" indicates a block number, and a plurality of continuous numbers are recorded as a batch.

At the time of a backup process, meta-information about files, a block number recorded in the group block list 43, and data of the corresponding block are copied in the backup medium. As meta-information, file names and attributes of all the files included in the directory tree, or file names and attributes of the files that belong to the group are used.

When a file is referred to at the time of the restoring process, the block management unit 22 obtains the corresponding block number from the file name, and accesses the backup data of the block.

When the information of all the files is recorded as meta-information at that time, even the file name of the file that does not belong to the group can be seen on the computer 11 like file d of FIG. 21. Since the backup data of a block of the file d does not exist, however, an error is returned when this file is referred to. On the contrary to this, when only the file that belongs to the group is recorded as meta-information, all the files that can be seen, can be referred to since the file name of the file that does not belong to the group cannot be seen on the computer 11.

Furthermore, the group management unit 23 records the block that is changed after the previous backup process, in a group change block list 44 in the units of groups, thereby managing the recorded block. Then, the group management unit 23 notifies the block that is recorded in the group change block list 44, to the copy management unit 25 as a difference, and the copy management unit 25 copies only the notified block. In this way, the difference is backed up in the units of groups.

In a block list of FIGS. 19 and 24, a block number is explicitly recorded. Instead, a set of a plurality of continuous blocks may be recorded using an original address and length. Regarding other block lists, the process is the same.

In the group management process of (b. 4), the group management unit 23 sets a plurality of groups, and respectively backs up files with different schedules. Also, in the group management process of (b. 5), the group management unit 23 performs a grouping process so as to permit that one file belongs to a plurality of groups. In this way, flexible group setting and backup processes become possible.

The diagonal part of the disk 13 of FIG. 17 indicates a set of blocks recorded in one of the above-mentioned various block lists, and the data of these blocks is copied in the diagonal part of the backup medium 15 by the copy management unit 25.

According to such a method, a plurality of blocks including the blocks of different files can be copied as a batch, since a backup process is carried out on the basis of a block list that is prepared in advance. In this method, therefore, the number of accesses to the disk 13 is greatly reduced, and a situation close to a random access rarely occurs, compared with the case of copying files in the units of files.

In the block management of (a. 10), the contents of pieces of incremental backup data, or the incremental backup data and the entire backup data, are merged in the units of blocks after an incremental backup process and before the restoring process. Furthermore, two or more pieces of backup data including the entire backup data and incremental backup data may be merged. By gathering pieces of incremental backup data in advance, a restoring process can be economized.

Figure 25:
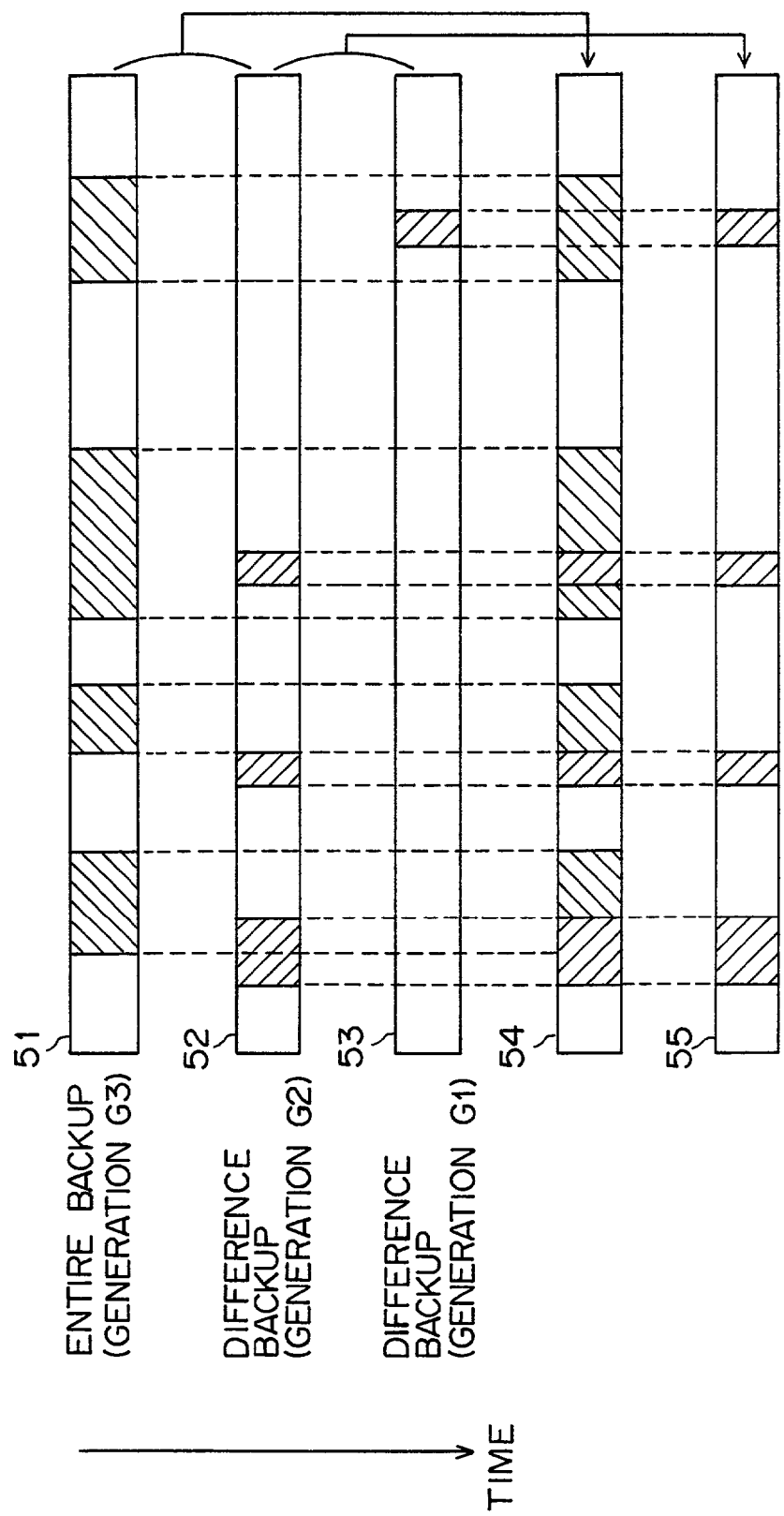
FIG. 25 is a chart showing a merging process of difference backup data.

FIG. 25 shows an example of such a merge process. In FIG. 25, the entire backup data 51 indicates the backup data of the first generation G3, and pieces of incremental backup data 52 and 53 show the differences of generations G2 and G1, respectively. In this case, generation G3 is the oldest, while generation G1 is the newest. The diagonal part indicates an area where backup data exists.

When the entire backup data 51 and incremental backup data 52 are merged, backup data 54 is formed. In the same area, however, the newer data is preferentially stored. In this case, data is referred to only using backup data 55 and the incremental backup data 53, at the time of the restoring process.

When the incremental backup data 52 and incremental backup data 53 are merged, backup data 55 is formed. In this case, data is referred to only using the backup data 55 and the entire backup data 51, at the time of the restoring process.

In the block management process of (a. 11), a user selects a point which becomes the standard for a difference, at the time of an incremental backup process. Then, the block management unit 22 records only the blocks that are changed at and after the selected point, in the change block list 42. After that, the copy management unit 25 copies only these blocks.

In this way, the start point of an incremental backup process can be changed if necessary, so that the change made between the previous backup time and the selected time is not stored in the backup medium 15. Therefore, it becomes possible to select the change reflected on a restoring process.

Figure 26:
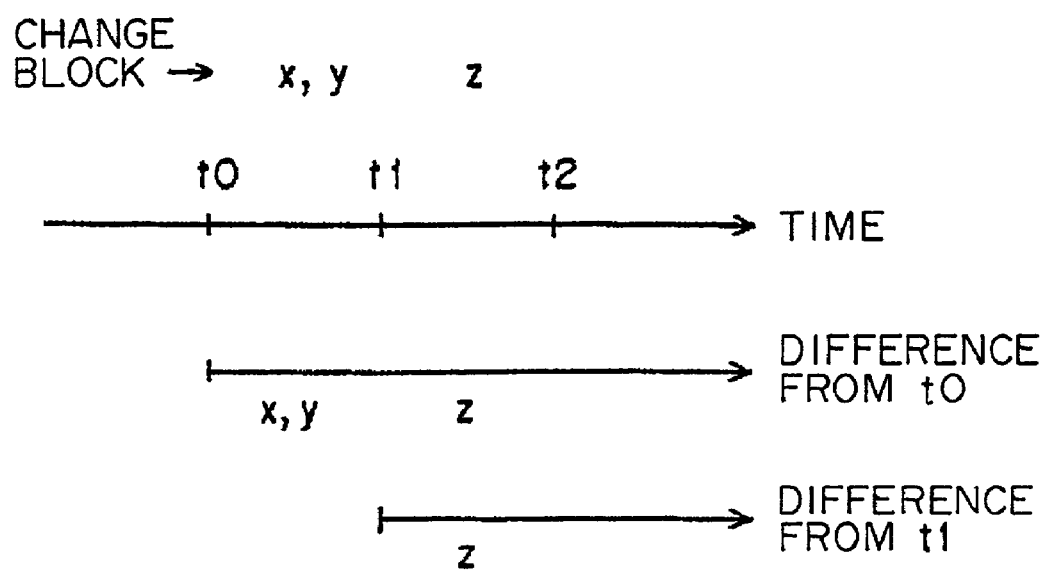
FIG. 26 is a chart showing changes made at the time of a backup start point.

FIG. 26 shows an example of changing the start point of an incremental backup process. At time t0, the previous incremental backup process is carried out, and blocks x and y are added in the change block list 42 between time t0 and time t1, and block z is added in the change block list 42 between time t1 and time t2. If a user does not change the start point of the incremental backup process, blocks x, y and z are recorded in the change block list 42 at time t2, as the difference made after time t0.

When a user designates time t1 as the start point of an incremental backup process, however, the block management unit 22 clears the change block list 42 at time t1, and it erases the block numbers of blocks x and y. After that, block z is added in the change block list 42. At time t2, only block z is recorded as a difference after time t1. At the time of the next backup process, an incremental backup process is carried out on the basis of the differences made after time t1.

In the copy control management of (a. 12), in the case that a plurality of disks 13 exist in a cluster, the copy management unit 25 instructs each computer 11 to copy any disk 13, thereby dispersing copy processes to the computers 11. Then, each computer 11 copies the disk 13 that is designated by the copy management unit 25. Thus, the disk 13 is copied by a plurality of computers 11, so that the load of a backup process is dispersed, and finally the copy time is shortened.

Figure 27:
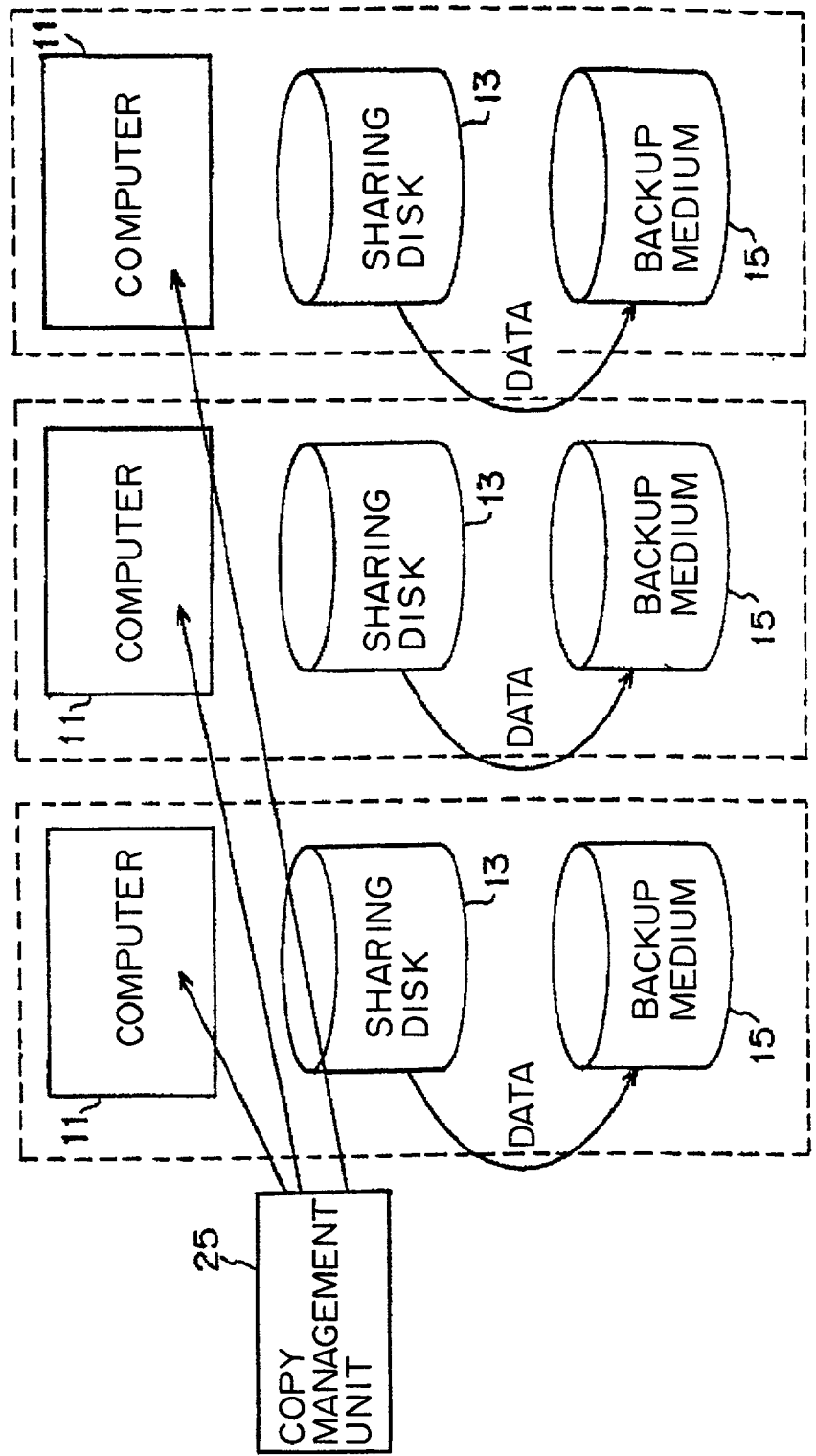
FIG. 27 is a diagram showing copy management.

FIG. 27 shows an example of such a copy management process. A plurality of backup media 15 are installed in the cluster of FIG. 27. The copy management unit 25 notifies each computer 11 of the device name of the disk 13 to be copied as well as the device name of the backup medium 15 in which the disk 13 is copied, and it requests each computer to perform a copy process. The computer 11 that is requested for a copy process copies the data of the disk 13 with the device name, in the backup medium 15 with the notified device name. At this time, the copy processes are simultaneously carried out by the plurality of computers 11.

Next, the processes performed at the time of the restoring process regarding the above-mentioned characteristics (c. 1) to (c. 5) are explained in detail with reference to FIGS. 28 to 33.

In the process of (c. 1), a file system restores data by installing the backup medium 15 directly instead of installing the disk 13. In this way, each computer 11 can directly access the backup data that is stored in the backup medium 15, and a special operation for the restoring process is not required.

Figure 28:
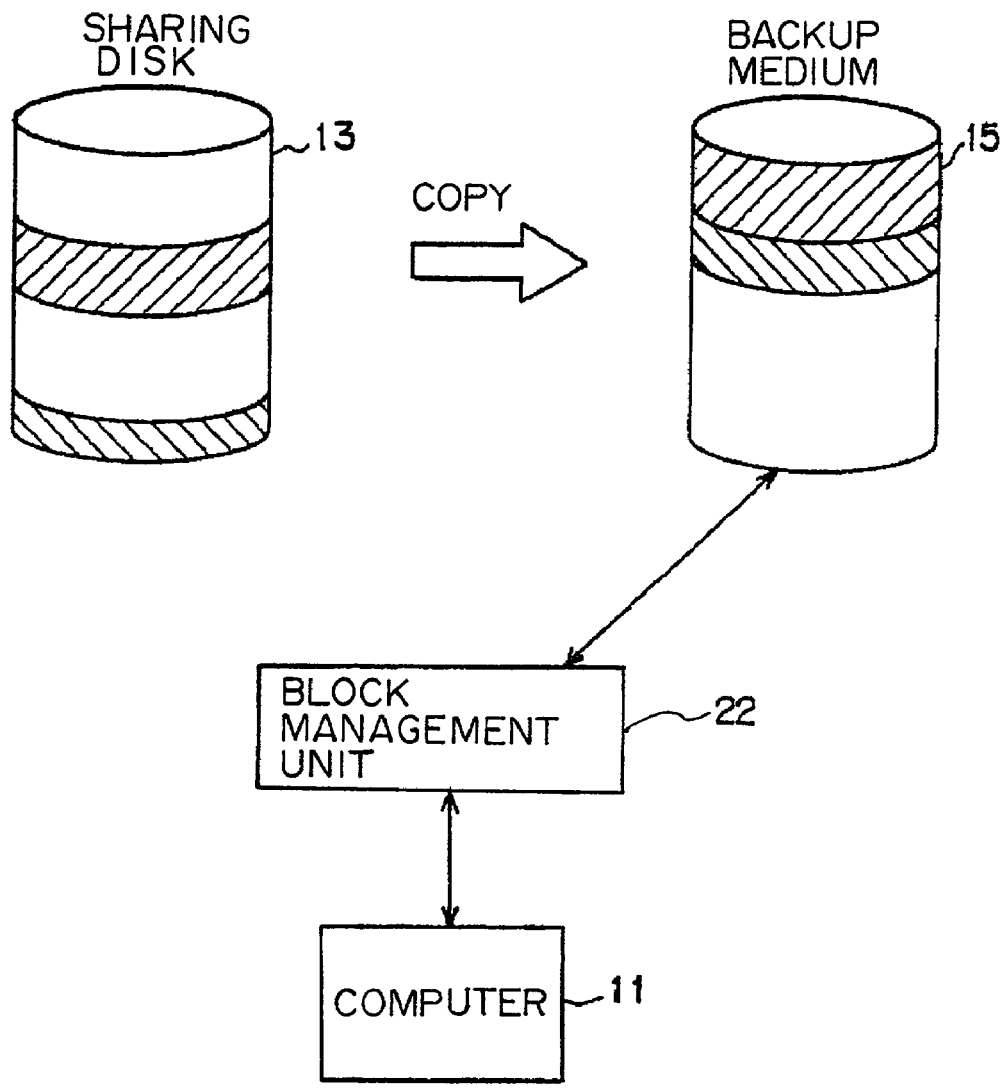
FIG. 28 is a diagram showing the mounting process of a backup medium.

FIG. 28 shows a process in which the block management unit 22 mounts the backup medium 15 on a file system. In FIG. 28, the block management unit 22 returns the corresponding data stored in the backup medium 15 to the computer 11, when it receives a reference request for the disk 13 from the computer 11 after the data (diagonal part) of the disk 13 is copied in the backup medium 15.

Figure 29:
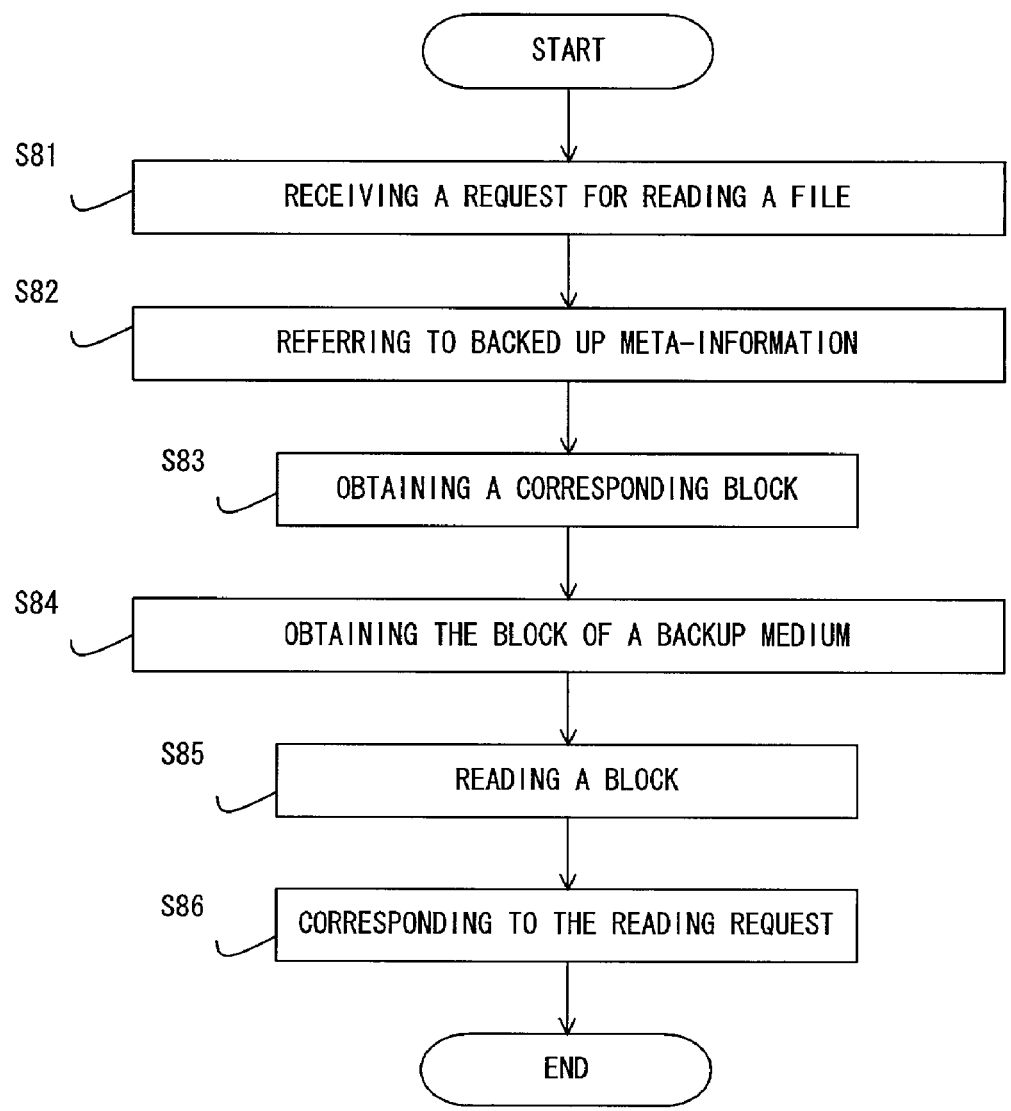
FIG. 29 is a flowchart showing the first reference process.

FIG. 29 is a flowchart showing such a reference process. First, the block management unit 22 receives a reading request of a file from the computer 11 (step S81). In the reading request, a file name, and offset a and size S of the reading area are included. Next, the block management unit 22 refers to the meta-information of the backup medium 15 (step S82), and it requests number #x of the block that is allocated in the range of a to a+S of the corresponding file (step S83).

Next, the block management unit 22 requests a number #y of the block on the backup medium 15 on which data of the block number #x is stored, reads the data of the block (step S85), responds the reading request (step S86), and terminates processes.

In the process of (c. 2), the block management unit 22 traces a plurality of pieces of incremental backup data while searching for incremental backup data in order from the latest data, at the time of restoring process incremental backup data. In the case of incremental backup data, since the required data is stored in any piece of the backup data of a plurality of generations, all the data is represented to the computer 11 by searching for the backup data.

FIG. 30 shows such a generation management process. In FIG. 30, the backup data of each generation is stored in the different backup media 15. Block management information 61 maps the device name of the block number of the disk 13. Block management information 62 is mounted for each generation of the backup data, and maps the device name and block number of the disk 13, and the identification information and block number of the backup medium 15.

Upon receipt of an access request of a file from the information computer 11, the block management unit 22 obtains a device name and block number corresponding to the file name in reference to the block management information 61, and it passes them to the medium control unit 24.

The medium control unit 24 manages the backup data of each generation in the order of formation, and refers to the block management information 62 of the newest generation G1, so that the unit 24 checks whether there are the given device name and block number (block information). In the case that there is the given block information, a block number of the corresponding backup medium 15 is obtained, and the backup medium 15 of generation G1 is referred to. In the case that there is not the given block information, the block management information 62 of generation G2 which is one prior generation, is referred to, and it is checked whether there is the given block information.

If generations are traced back one by one by repeating such a process, the data corresponding to the given block information can be referred to in the backup medium 15 of any generation. Even in the case that an incremental backup process is carried out like this, it becomes possible to represent all the data to a user utilizing the backup data in the past.

Figure 31:
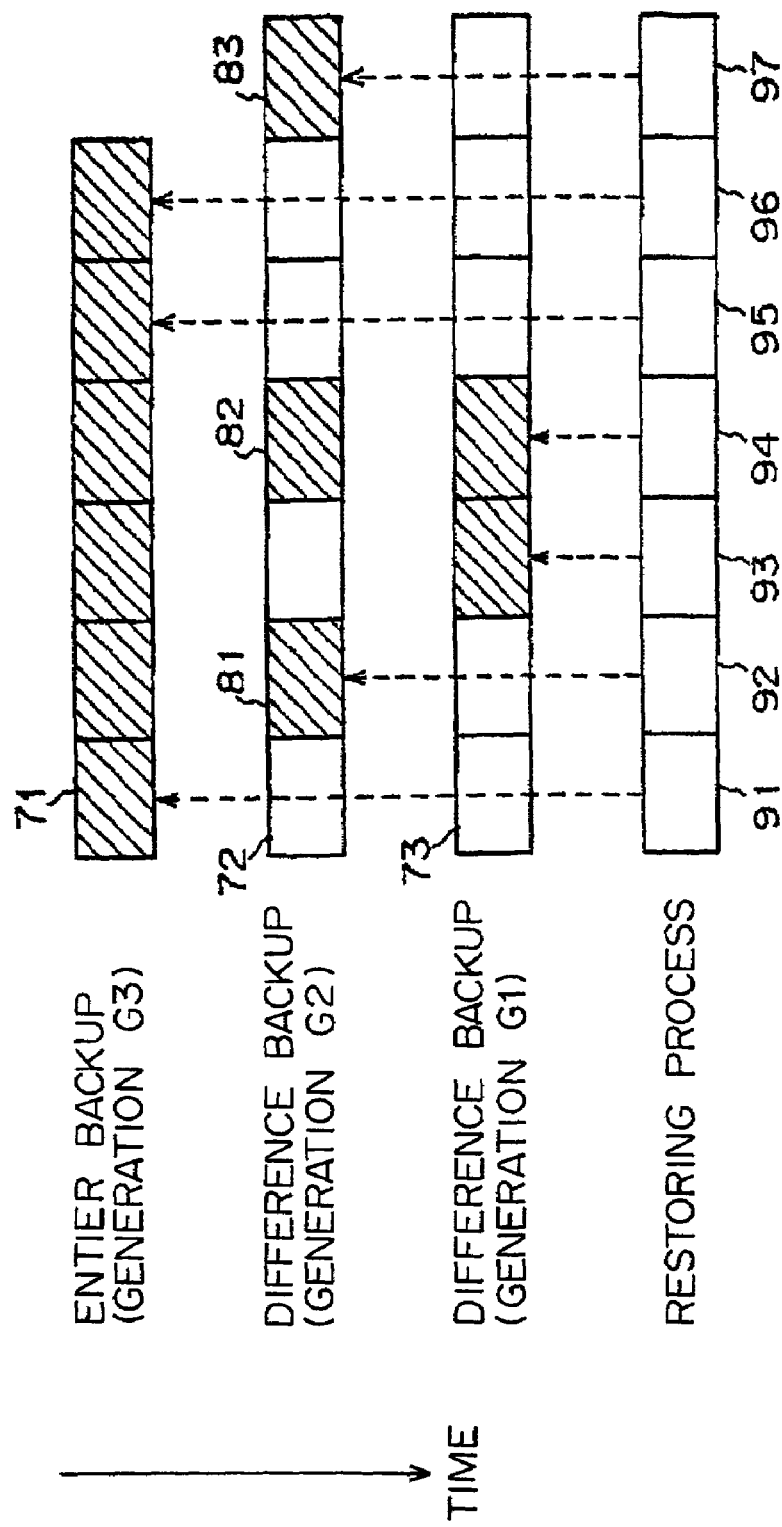
FIG. 31 is a chart showing the restoration of difference backup data.

FIG. 31 shows an example of the restoring process of an incremental backup process. In FIG. 31, entire backup data 71 indicates backup data of the first generation G3, while the pieces of incremental backup data 72 and 73 indicate the differences in generations G2 and G1, respectively. The diagonal part indicates a block where backup data exists. In the incremental backup data 72, for example, blocks 81 and 83 correspond to the changed data, while block 83 corresponds to newly added data.

When the data of blocks 93 and 94 are required at the time of the restoring process, a block corresponded by the backup data 73 is referred to. When the data of blocks 92 and 97 are required, a block corresponded by the incremental backup data 72 is referred to, while tracing back to generation G2. When the data of blocks 91, 95, and 96 are required, a block corresponded by the entire backup data 71 is referred to, while tracing back to generation G3.

Furthermore, in the case that the merge process as shown in FIG. 25 is performed, the same restoring process is carried out using the merged backup data, instead of two pieces of backup data to be merged.

In the processes of (c. 3) and (c. 4), the backup medium 15 is used as an accessible buffer from all the computers 11 inside a cluster, in the case that the backup data is stored on the tape 16. When the computer 11 refers to the backup data, only a required block is loaded into the backup medium 15 to be used as caches. In this way, only the required data can be stored on backup medium 15, so that the access efficiency to the data that is accessed frequently improves.

FIG. 32 shows a process of using the backup medium 15 as a buffer. Here, since only the computer 12 is connected with the tape 16 according to the configuration of FIG. 2, the tape control unit 27 of this computer 12 reads out the data of a required block from the tape 16 to be installed on the backup medium 15. As the backup medium 15, for example a disk is used. By referring to the data that is loaded into the backup medium 15, even the computer 11 that is not connected with the tape 16 can read the backup data that is stored in the tape 16.

FIG. 33 is a flowchart showing the reference process of backup data. The processes in steps S91 to S93 of FIG. 32 are the same as the processes in steps S81 to S83 of FIG. 29. Next, the block management unit 22 obtains a block number #y on the tape 16 on which the data of block number #x obtained in step S93 is stored (step S94), and it checks whether a cache of the block is present on the backup medium 15 (step S95).

If the cache does not exist on the backup medium 15, the tape control unit 27 reads the data of the block from the tape 16, and it writes the data in an empty block #z on the backup medium 15 (step S96). Then, the block management unit 22 responds to the reading request using the written data (step S97), and terminates processes. Also, if a cache does not exist on the backup medium 15, the block management unit 22 responds to the reading request using the data (step S97), and terminates processes.

In the process of (c. 5), in the case that a BI log of the log medium 14 is not written over the backup data of the backup medium 15, and the log and backup data are separately stored, the log is referred to first, while the backup data is referred to later if necessary. By referring to a log at the time of the restoring, the image at the backup start point is reproduced, so that the contradiction between pieces of data will not occur.

FIG. 34 shows a process of referring to a log of the log medium 14. After receiving an access request from the computer 11, the block management unit 22 confirms the existence and contents of the log in the log management unit 26, and refers to the log medium 14 if there is a log of the requested data, and it refers to the backup medium 15 if there is not the log.

FIG. 35 is a flowchart showing such a reference process. The processes in steps S101 to S103 of FIG. 35 are the same as the processes in steps S81 to S83 of FIG. 29. Next, the block management unit 22 asks the log management unit 26 about whether there is a log with the block number #x that is obtained in step S103 (step S104), and it checks the answer (step S105).

If the asked log exists, the block management unit 22 reads the log on the log medium 14. If there is not the asked log, the units 22 reads the backup data of the block, in order to obtain the number #y of the block on the corresponding backup medium 15 (step S107). Then, the unit 22 corresponds to the reading request, thereby terminating processes.

In the cluster system of FIG. 2, the cache control unit 21, block management unit 22, group management unit 23, medium control unit 24, copy management unit 25, log management unit 26, and tape control unit 27 are installed in the computer 12 to be used for management. However, part or all of these control units and management units may be installed in a plurality of computers 11, while being dispersed.

FIG. 36 shows a backup process in such a cluster system. In FIG. 36, the copy management unit 25, log management unit 26, and tape control unit 27 are installed in the computers 11 while being dispersed, and the computer 11 having the copy management unit 25 copies the contents of the disk 13 in the backup medium 15.

Each computer 11 transfers the BI log that occurs during the copy operation to the computer 11 having the log management unit 26, and the computer 11 edits the logs to be written in the log medium 14. Then, the backup data and log are written on the tape 16 by the computer 11 having the tape control unit 27.

FIG. 37 shows a restoring process in the cluster system of FIG. 36. In FIG. 37, the computer 11 having the tape control unit 27 receives a reading request from other computers 11, and it reads required backup data and log from the tape 16 separately, so that it develops these on the backup medium 15 and log medium 14 respectively.

When the development process terminates, the computer 11 that requests the reading, reads the log from the log medium 14, if there is a log. If there is not a log, the computer 11 receives a block number corresponding to the file name from the block management unit 22, and reads the backup data from the backup medium 15.

In the case that the computer 11 having the tape control unit 27 itself requests the reading, the backup data and log need not be developed on the backup medium 15 and log medium 14.

Figure 38:
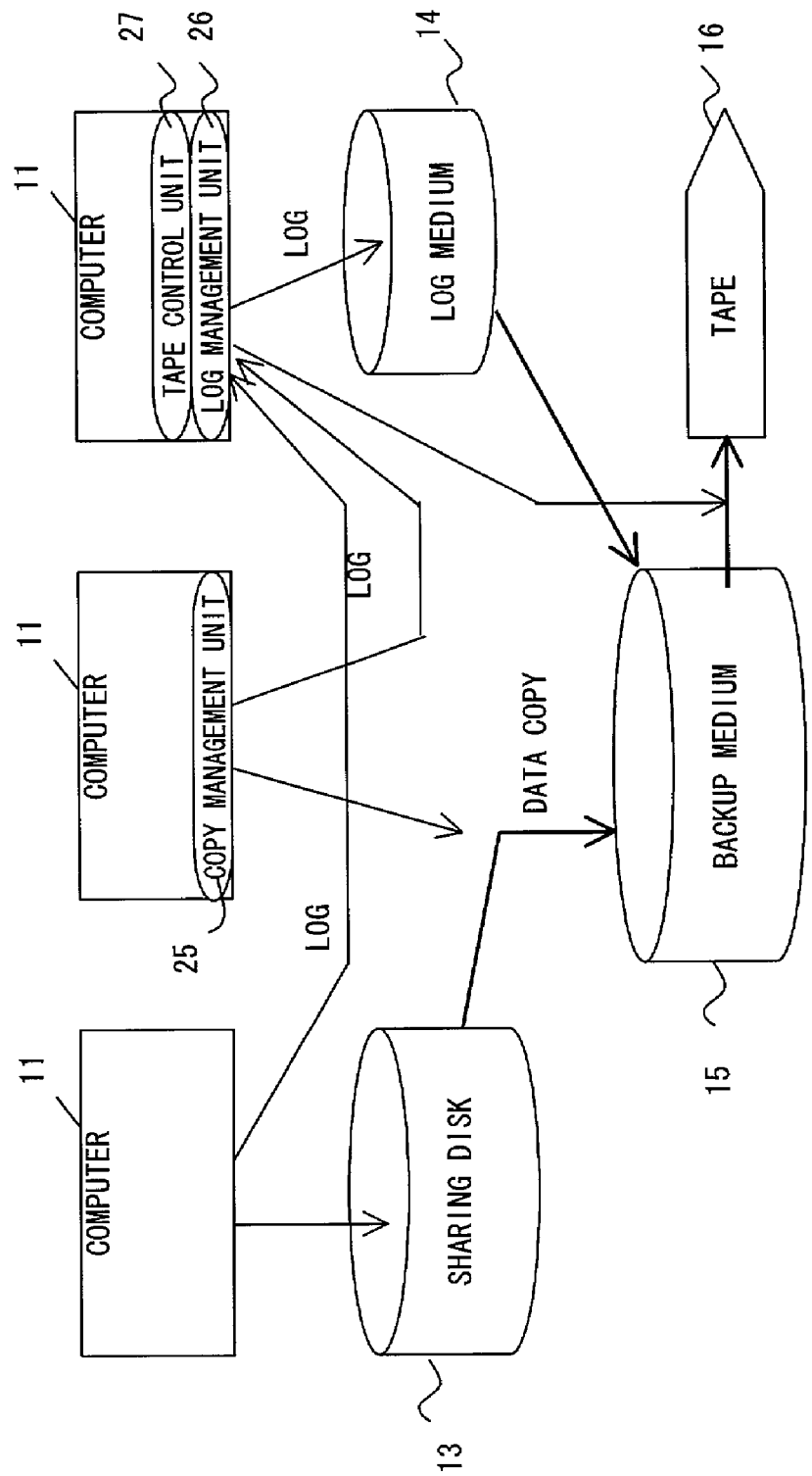
FIG. 38 is a drawing showing the second backup process.

FIG. 38 shows a case of writing a log over the backup data before writing the backup data on the tape 16 in the cluster system of FIG. 36. In FIG. 38, at the stage that the backup data and log are determined, the log management unit 26 writes the log of the log medium 14 over the backup data of the backup medium 15. When the over-writing process terminates, the tape control unit 27 writes the over-written backup data on the tape 16.

Figure 39:
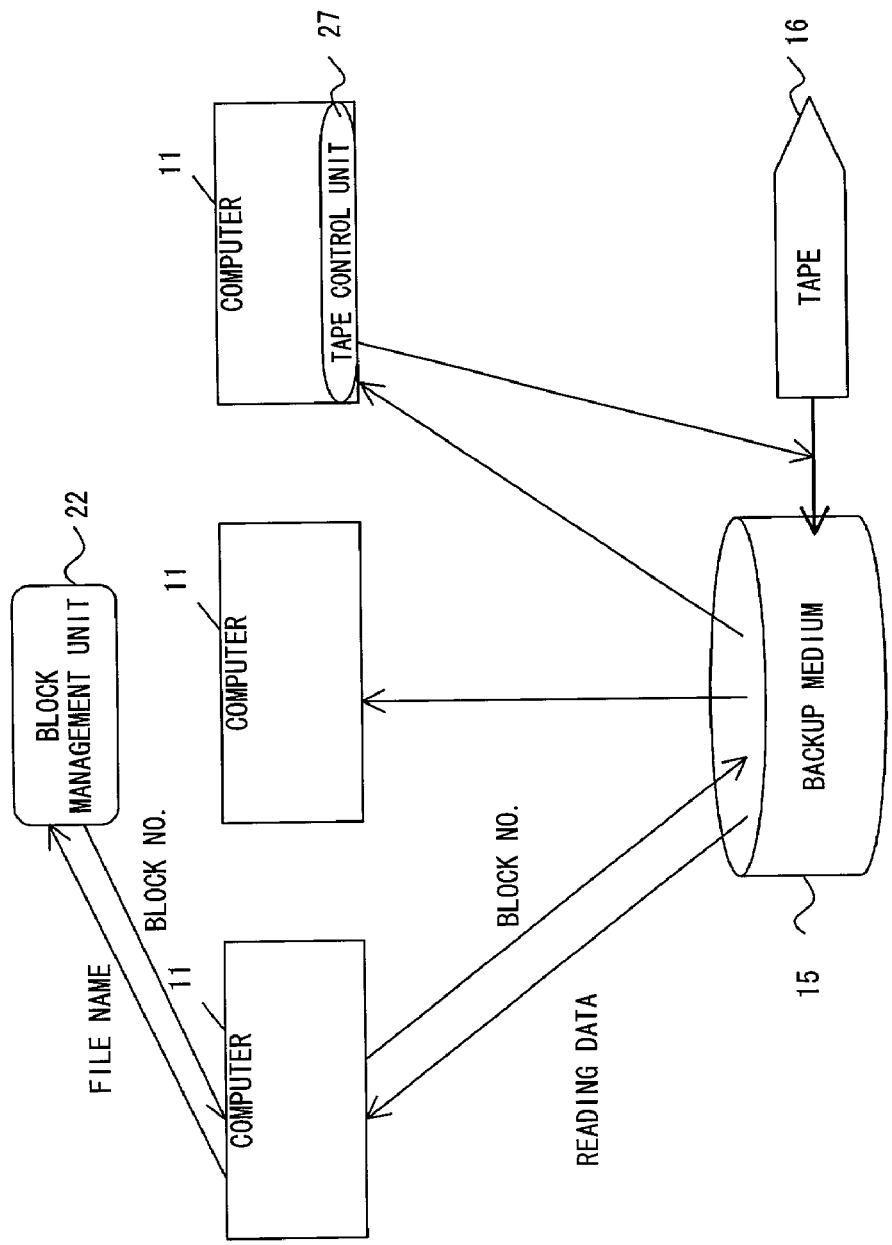
FIG. 39 is a drawing showing the second restoring process.

FIG. 39 shows the restoring process in the cluster system of FIG. 38. In FIG. 39, the tape control unit 27 reads the backup data over which a log is written, from the tape 16, and it develops the data on the backup medium 15. Then, the computer 11 that requests the reading process, reads required data from the backup medium 15. In the case that the computer 11 having the tape control unit 27 requests the reading process, however, the data need not be developed on the backup medium 15.

Figure 40:
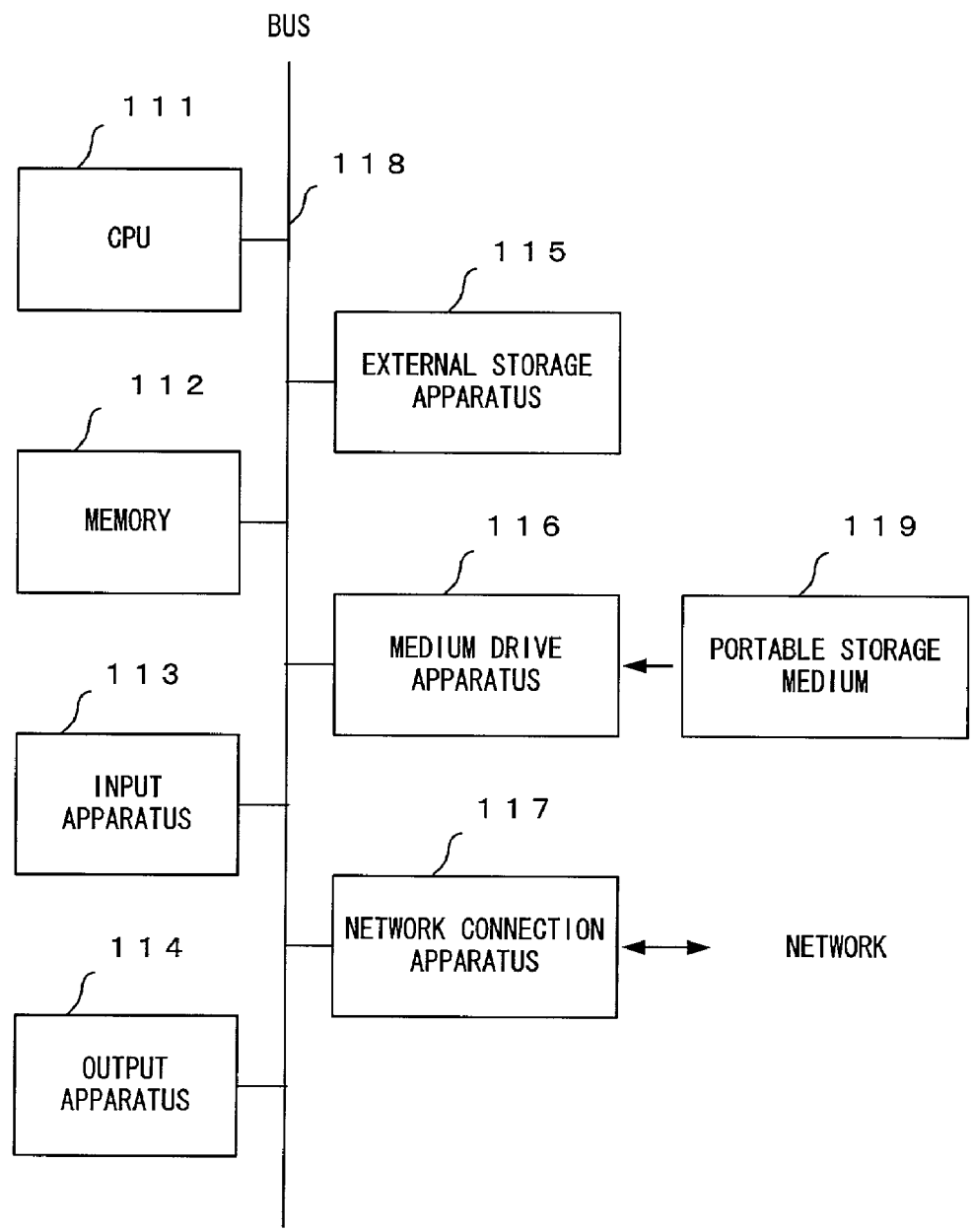
FIG. 40 is a chart showing the configuration of an information processor.

The computers 11 and 12 of FIG. 2 can be configured by using, for example an information processor as shown in FIG. 40. The information processor of FIG. 40 is provided with a CPU (central processing unit) 111, memory 112, input unit 113, output unit 114, external storage unit 115, medium drive unit 116, and network connection unit 117, which are connected by a bus 118.

The memory 112 includes, for example a ROM (read only memory), RAM (random access memory), etc, and it stores the program and data to be used for processes. The CPU 111 performs required processes by carrying out programs utilizing the memory 112.

The cache control unit 21, block management unit 22, group management unit 23, medium control unit 24, copy management unit 25, log management unit 26, and tape control unit 27 of FIG. 2 are stored in the memory 112, for example as software components described by the programs.

The input apparatus 113 includes, for example a keyboard, pointing device, touch panel, etc. to be used to input the instructions or information from a user. The output apparatus 114 includes a display, printer, loud speaker, etc. to be used to output the inquiry to a user and the process result.

The external storage apparatus 115 includes, for example a magnetic disk apparatus, optical disk apparatus, magneto-optical disk apparatus, tape apparatus, etc. The information processor stores the above-mentioned program and data on the external storage apparatus 115, and it loads them into the memory 112 to be used if necessary. Further, the external storage apparatus 115 is used as the sharing disk 13, log medium 14, backup medium 15, tape 16, etc.

A medium drive apparatus 116 drives a portable storage medium 119, thereby accessing the recorded contents. As the portable storage medium 119, an optional computer-readable storage medium such as a memory card, floppy disk, CO-ROM (compact disk read only memory), optical disk, magneto-optical disk or the like is used. A user stores the above-mentioned program and data in the computer-readable storage medium 119, and loads them into the memory 112 to be used if necessary.

The network connection apparatus 117 is used for the connection of communication networks for connecting computers, and performs the data conversion associated with the communication. The information processor receives the above-mentioned program and data through the network connection apparatus 117 from the other apparatus, and it loads them into the memory 112 to be used if necessary.

FIG. 41 shows a computer-readable storage medium that can supply a program and data to the information processor of FIG. 40. The program and data that are stored in the portable storage medium 119 and a database 121 of a data server 120 are loaded into the memory 112. At that time, the server 120 generates a conveyance signal for conveying the programs, etc., and transmits the signal to the information processor through an optional transmission medium on the network. Then, the CPU 111 runs the program using the data, and performs required processes.

According to the present invention, data can be efficiently backed up during the operation of the system, in a computer system having the disk shared file system like a cluster system. Further, backup data can be referred to efficiently at the time of a restoring process.

What is claimed is:

1. A backup system for backing up a sharing medium shared by a plurality of computers, comprising:
    a log management device, when one of the plurality of computers accesses the sharing medium to write data, managing original data before a write access occurs as a log including recording a time of the log, and generating an entire log by gathering logs of two or more computers, by selecting an oldest log from among logs for the same area in the sharing medium if there are the logs for the same area among the logs of the two or more computers, and by discarding a remaining log among the logs for the same area; and
    a formation device forming data at a backup start point using the entire log.

2. The backup system according to claim 1 further comprising a temporary log storage device temporarily storing each log of the plurality of computers, wherein the log management device edits each log stored in the temporary log storage device and forms the entire log.

3. The backup system according to claim 1 wherein when one of the plurality of computers accesses the sharing medium, the log management device receives an access notice from the computer that has accessed the sharing medium, and stores a log of the computer, thereby forming the entire log.

4. The backup system according to claim 1 further comprising a backup storage device storing backup data of the sharing medium, wherein the log management device stores the entire log in the backup storage device.

5. The backup system according to claim 1 further comprising a backup storage device storing backup data of the sharing medium and a log storage device storing the entire log.

6. The backup system according to claim 1 further comprising a backup storage device storing backup data of the sharing medium, wherein the log management device writes the entire log over the backup data.

7. The backup system according to claim 1 further comprising a log storage device storing a log managed by the log management device and address information of backup data over which a log is written, wherein the formation device writes a log over a corresponding backup data based on the address information.

8. The backup system according to claim 1 wherein in a case that the entire log is not written over backup data of the sharing medium, the formation device refers to the entire log first, and the backup data later if necessary.

9. A computer-readable recording medium recording a program for a computer to back up a sharing medium shared by a plurality of computers, the program enabling the computer to perform:
    managing, when one of the plurality of computers accesses the sharing medium to write data, original data before a write access occurs as a log including recording a time of the log,
    generating an entire log by gathering logs of two or more computers, by selecting an oldest log from among logs for the same area in the sharing medium if there are the logs for the same area among the logs of the two or more computers, and by discarding a remaining log among the logs for the same area; and
    forming data at a backup start point using the entire log.

10. A backup method for backing up a sharing medium shared by a plurality of computers, comprising:
    managing, when one of the plurality of computers accesses the sharing medium to write data, original data before a write access occurs as a log including recording a time of the log;
    generating an entire log by gathering logs of two or more computers, by selecting an oldest log from among logs for the same area in the sharing medium if there are the logs for the same area the logs of the two or more computers, and by discarding a remaining log among the logs for the same area; and
    forming data at a backup start point using the entire log.

11. A backup system for backing up a sharing medium shared by a plurality of computers, comprising:
    log management means for managing, when one of the plurality of computers accesses the sharing medium to write data, original data before a write access occurs as a log including recording a time of the log and generating an entire log by gathering logs of two or more computers, by selecting an oldest log from among logs for the same area in the sharing medium if there are logs for the same area among the logs of the two or more computers, and by discarding a remaining log among the logs for the same area; and
    formation means for forming data at a start point of a backup process using the entire log.
    copying a plurality of unit areas of the sharing medium in a backup medium as a batch.

12. A propagation signal for propagating a program to a computer to back up a sharing medium shared by a plurality of computers, the program enabling the computer to perform:
 managing, when one of the plurality of computers accesses the sharing medium to write data, original data before a write access occurs as a log including recording a time of the log;
 generating an entire log by gathering logs of two or more computers, by selecting an oldest log from among logs for the same area in the sharing medium if there are the logs for the same area the logs of the two or more computers, and by discarding a remaining log among the logs for the same area; and
 forming data at a backup start point using the entire log.

13. A method of backing up stored data, comprising:
 copying the stored data into a computer log before an access for an update of the data occurs including recording a time of the log;
 obtaining the logs of two or more computers as a combined log as the copying into the log occurs,
 writing the entire log onto a sharing medium, by selecting an oldest log from among logs for the same area in the sharing medium if there are the logs for the same area among the logs of the two or more computers, and by discarding a remaining log among the logs for the same area; and
 using the combined log to form a backup start point.

* * * * *

UNITED STATES PATENT AND TRADEMARK OFFICE
CERTIFICATE OF CORRECTION

| | | |
|---|---|---|
| PATENT NO. | : 7,051,173 B2 | Page 1 of 1 |
| APPLICATION NO. | : 09/752467 | |
| DATED | : May 23, 2006 | |
| INVENTOR(S) | : Yoshihiro Tsuchiya et al. | |

It is certified that error appears in the above-identified patent and that said Letters Patent is hereby corrected as shown below:

On the cover page, column 2, Foreign Patent Documents, change "Pelkari" to --Peikari--

Column 20, line 22, change "back up" to --backup--

Column 20, lines 63-64, after "log.", delete "copying a plurality of unit areas of the sharing medium in a backup medium as a batch."

Column 21, line 2, change "back up" to --backup--

Signed and Sealed this

Twenty-first Day of November, 2006

JON W. DUDAS
*Director of the United States Patent and Trademark Office*